United States Patent
Zou et al.

(10) Patent No.: US 11,552,954 B2
(45) Date of Patent: *Jan. 10, 2023

(54) PRIVATE CLOUD CONTROL

(71) Applicant: Palo Alto Networks, Inc., Santa Clara, CA (US)

(72) Inventors: Xu Zou, San Jose, CA (US); Jianlin Zeng, San Jose, CA (US); Mei Wang, Saratoga, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,345

(22) Filed: Jul. 23, 2019

(65) Prior Publication Data

US 2020/0162474 A1     May 21, 2020

Related U.S. Application Data

(63) Continuation of application No. 15/703,913, filed on Sep. 13, 2017, now Pat. No. 10,362,037, which is a
(Continued)

(51) Int. Cl.
*H04L 29/06* (2006.01)
*H04L 9/40* (2022.01)

(52) U.S. Cl.
CPC ........ *H04L 63/102* (2013.01); *H04L 63/0263* (2013.01); *H04L 63/08* (2013.01);
(Continued)

(58) Field of Classification Search
CPC ........ G06F 21/44; G06F 21/45; G06F 21/554; H04W 4/005; H04W 12/08; H04W 48/16;
(Continued)

(56) References Cited

U.S. PATENT DOCUMENTS 6,877,146 B1   4/2005   Teig
8,146,133 B2   3/2012   Moon
(Continued)

FOREIGN PATENT DOCUMENTS

CN   102025577   7/2012
CN   107862468   3/2018
(Continued)

OTHER PUBLICATIONS

Blackstock et al., IoT Interoperability: A Hub-based Approach, 2014, IEEE International Conference on the Internet of Things (IOT), pp. 80-84.
(Continued)

*Primary Examiner* — Tri M Tran
(74) *Attorney, Agent, or Firm* — Van Pelt, Yi & James LLP

(57) ABSTRACT

Management of IoT devices through a private cloud. An IoT device is coupled to a gateway. A request from the IoT device to connect to a private cloud, wherein the private cloud is used to manage IoT devices, is received at a private cloud control center agent. An identification of the IoT device is determined. The IoT device is onboarded, using the identification, for management through the private cloud. A device profile of the IoT device is generated. The flow of data to and from the IoT device is regulated through application of IoT rules according to the device profile of the IoT device.

20 Claims, 14 Drawing Sheets

Related U.S. Application Data continuation of application No. 14/743,913, filed on Jun. 18, 2015, now Pat. No. 9,774,604.

(60) Provisional application No. 62/104,646, filed on Jan. 16, 2015.

(52) U.S. Cl.
CPC ...... *H04L 63/1408* (2013.01); *H04L 63/1433* (2013.01); *H04L 63/1441* (2013.01)

(58) Field of Classification Search
CPC ......... H04L 12/66; H04L 41/08; H04L 43/16; H04L 63/00; H04L 63/08; H04L 63/10; H04L 67/04; H04L 67/10; H04L 67/12; H04L 67/16

See application file for complete search history.

(56) References Cited

U.S. PATENT DOCUMENTS

| | | |
|---|---|---|
| 8,159,966 B1 | 4/2012 | Mabee |
| 8,331,229 B1 | 12/2012 | Hu |
| 8,671,099 B2 | 3/2014 | Kapoor |
| 8,683,598 B1 | 3/2014 | Cashin |
| 8,850,588 B2 | 9/2014 | Kumar |
| 8,874,550 B1 | 10/2014 | Soubramanien |
| 8,891,528 B2 | 11/2014 | Moriarty |
| 8,898,788 B1 | 11/2014 | Aziz |
| 8,973,088 B1* | 3/2015 | Leung ............... H04L 63/102 726/1 |
| 9,324,119 B2 | 4/2016 | Singh |
| 9,516,053 B1 | 12/2016 | Muddu |
| 9,548,987 B1 | 1/2017 | Poole |
| 9,584,536 B2 | 2/2017 | Nantel |
| 9,600,571 B2 | 3/2017 | Shaashua |
| 9,609,003 B1 | 3/2017 | Chmielewski |
| 9,661,011 B1 | 5/2017 | Van Horenbeeck |
| 9,692,784 B1 | 6/2017 | Nenov |
| 9,774,604 B2 | 9/2017 | Zou |
| 9,891,907 B2 | 2/2018 | Searle |
| 9,961,096 B1 | 5/2018 | Pierce |
| 9,984,344 B2 | 5/2018 | Singh |
| 10,038,700 B1 | 7/2018 | Duchin |
| 10,043,591 B1 | 8/2018 | Laborde |
| 10,122,747 B2 | 11/2018 | Mahaffey |
| 10,191,794 B2 | 1/2019 | Smith |
| 10,204,312 B2 | 2/2019 | Singh |
| 10,212,176 B2 | 2/2019 | Wang |
| 10,212,178 B2 | 2/2019 | Cheng |
| 10,229,269 B1 | 3/2019 | Patton |
| 10,237,875 B1 | 3/2019 | Romanov |
| 10,320,613 B1 | 6/2019 | Cam-Winget |
| 10,348,739 B2 | 7/2019 | Greenspan |
| 10,459,827 B1 | 10/2019 | Aghdaie |
| 10,489,361 B2 | 11/2019 | Sisk |
| 10,623,389 B2 | 4/2020 | Childress |
| 10,630,728 B2 | 4/2020 | Ghosh |
| 10,764,315 B1 | 9/2020 | Carroll |
| 10,887,306 B2 | 1/2021 | Gupta |
| 11,005,839 B1 | 5/2021 | Shahidzadeh |
| 11,070,568 B2 | 7/2021 | Ektare |
| 11,115,799 B1 | 9/2021 | Du |
| 11,455,641 B1 | 9/2022 | Shahidzadeh |
| 2004/0243835 A1* | 12/2004 | Terzis ............... H04L 63/102 726/3 |
| 2006/0265397 A1 | 11/2006 | Bryan |
| 2008/0059536 A1 | 3/2008 | Brock |
| 2010/0284282 A1 | 11/2010 | Golic |
| 2012/0065749 A1 | 3/2012 | Hunter |
| 2012/0102543 A1 | 4/2012 | Kohli |
| 2012/0240185 A1 | 9/2012 | Kapoor |
| 2013/0086261 A1 | 4/2013 | Lim |
| 2013/0173621 A1 | 7/2013 | Kapoor |
| 2013/0247190 A1 | 9/2013 | Spurlock |
| 2013/0305357 A1 | 11/2013 | Ayyagari |
| 2014/0006479 A1* | 1/2014 | Maloo ............... H04L 67/2814 709/203 |
| 2014/0244834 A1 | 8/2014 | Guedalia |
| 2014/0281912 A1* | 9/2014 | Doi ............... G06F 40/154 715/234 |
| 2014/0325670 A1 | 10/2014 | Singh |
| 2014/0337862 A1* | 11/2014 | Valencia ............... G06F 21/567 719/313 |
| 2015/0039513 A1 | 2/2015 | Adjaoute |
| 2015/0055623 A1 | 2/2015 | Li |
| 2015/0229654 A1* | 8/2015 | Perier ............... H04W 12/03 726/3 |
| 2015/0271192 A1 | 9/2015 | Crowley |
| 2015/0293954 A1 | 10/2015 | Hsiao |
| 2015/0295945 A1 | 10/2015 | Canzanese, Jr. |
| 2016/0028750 A1 | 1/2016 | Di Pietro |
| 2016/0036819 A1 | 2/2016 | Zehavi |
| 2016/0048984 A1 | 2/2016 | Frigo |
| 2016/0119372 A1* | 4/2016 | Borlick ............... H04L 67/025 726/25 |
| 2016/0128043 A1* | 5/2016 | Shuman ............... H04W 72/044 370/331 |
| 2016/0173446 A1 | 6/2016 | Nantel |
| 2016/0173495 A1* | 6/2016 | Joo ............... H04L 63/102 713/171 |
| 2016/0182497 A1 | 6/2016 | Smith |
| 2016/0212099 A1 | 7/2016 | Zou |
| 2016/0218949 A1 | 7/2016 | Dasgupta |
| 2016/0267406 A1 | 9/2016 | Bodo |
| 2016/0267408 A1 | 9/2016 | Singh |
| 2016/0277435 A1* | 9/2016 | Salajegheh ............ H04W 12/12 |
| 2016/0301707 A1 | 10/2016 | Cheng |
| 2016/0301717 A1 | 10/2016 | Dotan |
| 2016/0337127 A1 | 11/2016 | Schultz |
| 2016/0352685 A1 | 12/2016 | Park |
| 2016/0366141 A1 | 12/2016 | Smith |
| 2016/0366181 A1 | 12/2016 | Smith |
| 2017/0006028 A1 | 1/2017 | Tunnell |
| 2017/0006135 A1 | 1/2017 | Siebel |
| 2017/0011406 A1 | 1/2017 | Tunnell |
| 2017/0013005 A1 | 1/2017 | Galula |
| 2017/0055913 A1 | 3/2017 | Bandyopadhyay |
| 2017/0063774 A1 | 3/2017 | Chen |
| 2017/0093915 A1 | 3/2017 | Ellis |
| 2017/0118237 A1 | 4/2017 | Devi Reddy |
| 2017/0118240 A1 | 4/2017 | Devi Reddy |
| 2017/0124660 A1 | 5/2017 | Srivastava |
| 2017/0126704 A1 | 5/2017 | Nandha Premnath |
| 2017/0149813 A1 | 5/2017 | Wright |
| 2017/0180380 A1 | 6/2017 | Bagasra |
| 2017/0180399 A1 | 6/2017 | Sukhomlinov |
| 2017/0188242 A1 | 6/2017 | Ghosh |
| 2017/0200061 A1 | 7/2017 | Julian |
| 2017/0232300 A1 | 8/2017 | Tran |
| 2017/0235585 A1 | 8/2017 | Gupta |
| 2017/0235783 A1 | 8/2017 | Chen |
| 2017/0244737 A1 | 8/2017 | Kuperman |
| 2017/0251007 A1 | 8/2017 | Fujisawa |
| 2017/0272554 A1 | 9/2017 | Kwan |
| 2017/0279685 A1 | 9/2017 | Mota |
| 2017/0289184 A1 | 10/2017 | Subramanian |
| 2017/0331671 A1 | 11/2017 | Olsson |
| 2017/0331906 A1 | 11/2017 | Choi |
| 2017/0339178 A1 | 11/2017 | Mahaffey |
| 2017/0344407 A1 | 11/2017 | Jeon |
| 2017/0346677 A1 | 11/2017 | Suryanarayana |
| 2018/0007058 A1 | 1/2018 | Zou |
| 2018/0012227 A1 | 1/2018 | Tunnell |
| 2018/0018684 A1 | 1/2018 | Orr |
| 2018/0027006 A1 | 1/2018 | Zimmermann |
| 2018/0078843 A1 | 3/2018 | Tran |
| 2018/0115574 A1 | 4/2018 | Ridley |
| 2018/0117446 A1 | 5/2018 | Tran |
| 2018/0117447 A1 | 5/2018 | Tran |
| 2018/0139227 A1 | 5/2018 | Martin |
| 2018/0144139 A1 | 5/2018 | Cheng |
| 2018/0191729 A1 | 7/2018 | Whittle |
| 2018/0191746 A1 | 7/2018 | De Knijf |

(56) References Cited

U.S. PATENT DOCUMENTS

| | | |
|---|---|---|
| 2018/0191848 A1 | 7/2018 | Bhattacharya |
| 2018/0205793 A1 | 7/2018 | Loeb |
| 2018/0212768 A1 | 7/2018 | Kawashima |
| 2018/0234519 A1 | 8/2018 | Boyapalle |
| 2018/0248902 A1 | 8/2018 | Dănilă-Dumitrescu |
| 2018/0255084 A1 | 9/2018 | Kotinas |
| 2018/0264347 A1 | 9/2018 | Tran |
| 2018/0285234 A1 | 10/2018 | Degaonkar |
| 2018/0293387 A1 | 10/2018 | Bar-El |
| 2018/0295148 A1 | 10/2018 | Mayorgo |
| 2018/0349598 A1 | 12/2018 | Harel |
| 2018/0349612 A1 | 12/2018 | Harel |
| 2018/0357556 A1 | 12/2018 | Rai |
| 2018/0375887 A1 | 12/2018 | Dezent |
| 2019/0019249 A1 | 1/2019 | Bhattacharjee |
| 2019/0081961 A1 | 3/2019 | Bansal |
| 2019/0098028 A1 | 3/2019 | Ektare |
| 2019/0098058 A1 | 3/2019 | Ikegami |
| 2019/0109717 A1 | 4/2019 | Reddy |
| 2019/0121978 A1 | 4/2019 | Kraemer |
| 2019/0138512 A1 | 5/2019 | Pourmohammad |
| 2019/0182278 A1 | 6/2019 | Das |
| 2019/0268305 A1 | 8/2019 | Xu |
| 2019/0349426 A1 | 11/2019 | Smith |
| 2019/0361917 A1 | 11/2019 | Tran |
| 2019/0373472 A1 | 12/2019 | Smith |
| 2019/0387399 A1 | 12/2019 | Weinberg |
| 2020/0076846 A1 | 3/2020 | Pandian |
| 2020/0076853 A1 | 3/2020 | Pandian |
| 2020/0117690 A1 | 4/2020 | Tran |
| 2020/0156654 A1 | 5/2020 | Boss |
| 2020/0162278 A1 | 5/2020 | Delaney |
| 2020/0177485 A1 | 6/2020 | Shurtleff |
| 2020/0177589 A1 | 6/2020 | Mangalvedkar |
| 2020/0213146 A1 | 7/2020 | Kodam |
| 2020/0409957 A1 | 12/2020 | Zhang |

FOREIGN PATENT DOCUMENTS

| | | |
|---|---|---|
| CN | 108650133 | 10/2018 |
| CN | 107135093 | 5/2020 |
| EP | 3136297 | 3/2017 |
| JP | 2018513467 | 5/2018 |
| WO | 2019218874 | 11/2019 |

OTHER PUBLICATIONS

Miloslavskaya et al., Ensuring Information Security for Internet of Things, 2017, IEEE 5th International Conference of Future Internet of Things and Cloud, pp. 62-69.

Fredj et al., A Scalable IoT Service Search Based on Clustering and Aggregation, 2013 IEEE International Conference on Green Computing and Communication and IEEE Internet of Things and IEEE Cyber, Physical and Social Computing, pp. 1-8.

International Application No. PCT/US2016/025661, International Search Report and Written Opinion dated Jul. 7, 2016.

Liu et al., A Lightweight Anomaly Mining Algorithm in the Internet of Things, 2014 IEEE 5th International Conference on Software Engineering and Service Science, 2014, pp. 1142-1145.

Sivanathan et al., Classifying IoT Devices in Smart Environments Using Network Traffic Characteristics, IEEE, TMC, No. 8, pp. 1745-1759, Aug. 2018.

Sivanathan et al., Detecting Behavioral Change of IoT Devices Using Clustering-Based Network Traffic Modeling, IEEE LCN 2019, Mar. 30, 2020.

Sivanathan et al., Inferring IoT Device Types from Network Behavior Using Unsupervised Clustering, IEEE ICN 2019, Oct. 2019.

Li et al., A Distributed Consensus Algorithm for Decision Making in Service-Oriented Internet of Things, Old Dominion University, ODU Digital Commons, 2014.

Nguyen et al., A Software-Defined Model for IoT Clusters: Enabling Applications on Demand, Faculty of Engineering and IT, University of Technology Sydney, Australia, IEEE Xplore, Apr. 23, 2018.

Author Unknown, Cisco Encrypted Traffic Analytics, Feb. 10, 2021.

Al-Shaer et al., Design and Implementation of Firewall Policy Advisor Tools, 2002.

Al-Shaer et al., Firewall Policy Advisor for Anomaly Discovery and Rule Editing, Integrated Network Management VIII, 2003.

Charyyev et al., Locality-Sensitive IoT Network Traffic Fingerprinting for Device Identification, IEEE Internet of Things Journal, 2020, vol. 8, No. 3, pp. 1272-1281.

Du et al., A Lightweight Flow Feature-Based IoT Device Identification Scheme, Security and Communication Networks, 2022.

Martin et al., Requirements and Recommendations for CWE Compatibility and CWE Effectiveness, Version 1.0, Jul. 28, 2011.

National Electrical Manufacturers Association, Manufacturer Disclosure Statement for Medical Device Security, HIMSS/NEMA Standard HN 1-2013, 2013.

Zhao et al., A Few-Shot Learning Based Approach to IoT Traffic Classification, IEEE Communications Letters, 2021.

Arash Fasihi, Rule Based Inference and Action Selection Based on Monitoring Data in IoT, Dec. 1, 2015.

Cramer et al., Detecting Anomalies in Device Event Data in the IoT, Proceedings of the 3td International Conference on Internet of Things, Big Data and Security, Mar. 21, 2018, pp. 52-62.

Midi et al., Kalis—A System for Knowledge-driven Adaptable Intrusion Detection for the Internet of Things, 2017 IEEE 37th International Conference on Distributed Computing Systems, pp. 656-666.

Charu C. Aggarwal, Outlier Analysis, Retrieved from the Internet, URL: https://web.archive.org/web/20130210212057/http://charuaggarwal.net/outlierbook.pdf.

Hirofumi Nakakoji, et al., "Study of the Incident Tendency Detection Method on Frequency Analysis," Technical Report of IEICE, Japan, The Institute of Electronics, Information and Communication Engineers (IEICE), Jul. 14, 2005, vol. 105, No. 193, pp. 83-88.

\* cited by examiner

PRIVATE CLOUD CONTROL

CROSS-REFERENCE TO RELATED APPLICATIONS

This application is a continuation of U.S. Non-Provisional patent application Ser. No. 15/703,913, filed Sep. 13, 2017, now U.S. Pat. No. 10,362,037, which is a continuation of U.S. Non-Provisional patent application Ser. No. 14/743,913, filed Jun. 18, 2015, now U.S. Pat. No. 9,774,604, which claims priority to U.S. Provisional Patent Application No. 62/104,646, filed Jan. 16, 2015, all of which are incorporated by reference herein.

BACKGROUND

An area of ongoing research and development is smart devices. In particular Internet of Things (hereinafter referred to as "IoT") devices, have been developed allowing for network based control of devices used in daily life.

While IoT devices provide convenience in their ability to be controlled through a network from remote locations passively, there exist problems with managing IoT devices. In particular problems exist in preventing attacks against IoT devices and ensuring that such devices are not compromised. There therefore exists the need for managing IoT devices while preventing attacks and corruptions on IoT devices and networks formed through such IoT devices.

The foregoing examples of the related art and limitations related therewith are intended to be illustrative and not exclusive. Other limitations of the relevant art will become apparent to those of skill in the art upon reading the specification and studying of the drawings.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

Various implementations include systems and methods for management of IoT devices through a private cloud. In various implementations, an IoT device is coupled to a gateway. Further, in various implementations, a request from the IoT device to connect to a private cloud, wherein the private cloud is used to manage IoT devices, is received at a private cloud control center agent. In various implementations, an identification of the IoT device is determined. Additionally, in various implementations, the IoT device is onboarded, using the identification, for management through the private cloud. In various implementations, a device profile of the IoT device is generated. Further, in various implementations, the flow of data to and from the IoT device is regulated through application of IoT rules of an IoT firewall according to the device profile of the IoT device.

These and other advantages will become apparent to those skilled in the relevant art upon a reading of the following descriptions and a study of the several examples of the drawings.

DETAILED DESCRIPTION

Figure 1:
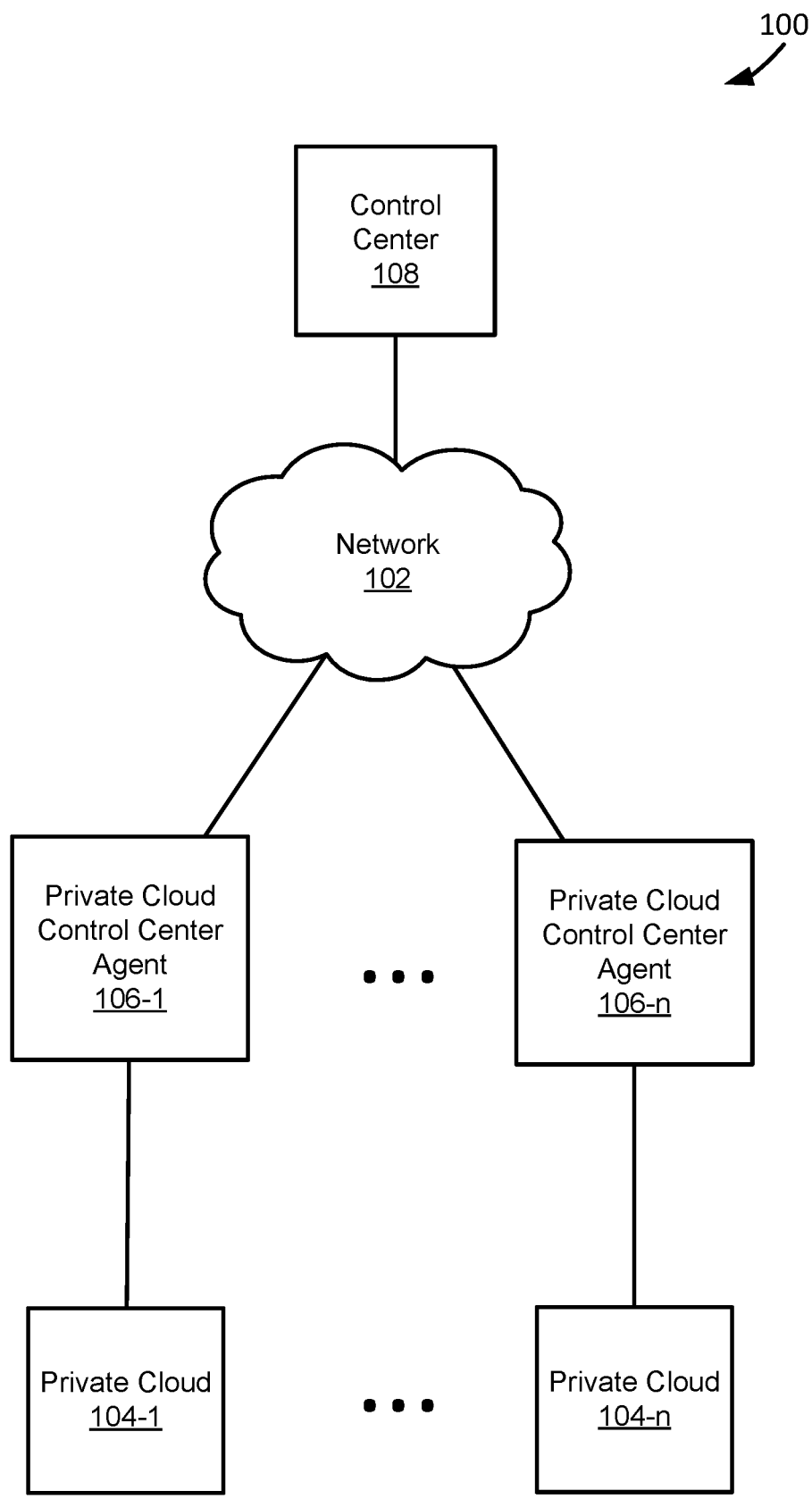
FIG. 1 depicts a diagram of an example of a system for managing private clouds through agents of the private clouds.

FIG. 1 depicts a diagram 100 of an example of a system for managing private clouds through agents of the private clouds. The system of the example of FIG. 1 includes private cloud 104-1 . . . 104-n (hereinafter referred to as "private clouds 104"), private cloud control center agent 106-1 . . . 106-n (hereinafter referred to as "private cloud control center agents 106"), and a control center 108.

In the example of FIG. 1, the network 102 functions to couple the control center 108 to the private cloud control center agents 106. In coupling the control center 108 to the private cloud control center agents 106, the network 102 can be used to transmit data for managing IoT devices. Depending upon implementation-specific or other considerations, the network 102 can be part of a public network and/or a private network.

In the example of FIG. 1, the private clouds 104 function to store data and allow for the transmission of data as part of managing IoT devices. The private clouds 104 can be created, at least in part, by applying an IoT firewall to data transmitted between IoT devices, e.g. through a private network, and data transmitted between public networks and the IoT devices. Depending upon implementation-specific or other considerations each of the private clouds 104 can be specific to an entity or a plurality of entities. An entity can include a subset for grouping IoT devices. For example, a subset can include IoT devices within transmission range of a location, e.g. a residence, or IoT devices used by a group of people, e.g. a family. Data used in the management of IoT devices, can include data used in onboarding IoT devices, data used in managing IoT devices, and data used in enforcing security of IoT devices. For example, data stored in the private clouds 104 can include a session key for seamlessly onboarding IoT devices. In another example, data stored in the private clouds 104 can include IoT rules for an IoT firewall used in controlling onboarding of IoT devices and managing transmission of data to and from IoT devices.

In the example of FIG. 1, the private cloud control center agents 106 function to manage IoT devices using the private clouds 104. The private cloud control center agents 106 are coupled to corresponding private clouds through a computer-readable medium. Depending upon implementation-specific or other considerations, the private clouds control center agents 106 can be implemented as part of a networking device coupled to IoT devices managed by the private cloud control center agents 106. In managing IoT devices, the private cloud control center agents 106 can onboard IoT devices and/or control the transmission of data to and from the IoT devices through the private clouds 104 according to an IoT firewall. In various implementations, the private cloud control center agents 106 can be used to manage security of IoT devices, including detection of rogue IoT devices, based on data stored in the private clouds 106.

In the example of FIG. 1, the control center 108 functions to manage the private cloud control center agents 106 management of IoT devices. In managing the private cloud control center agents 106, the control center can assign the private cloud control center agents 106 to manage IoT devices of a specific entity or plurality of entities using a specific private cloud of plurality of private clouds of the private clouds 104. For example, the control center 108 can instruct the private cloud control center agent 106 to manage specific IoT devices of an entity using a specific private cloud of the entity. Further, in managing the private cloud control center agents 106, the control center can check to make sure the private cloud control center agents 106 are managing IoT devices according to data in the private clouds 104. For example, the control center 108 can check to determine whether the private cloud control center agent 106 is applying an IoT firewall correctly.

Making reference to the example of FIG. 1 to describe an example of operation of the system, the control center 108, which is coupled to the private cloud control center agents 106 via the network 102, assigns the private cloud control center agents 106 to entities associated with one or more of the private clouds 104. In this example of operation, the private cloud control center agents 106 manage the IoT devices associated with the private clouds 104.

Figure 2:
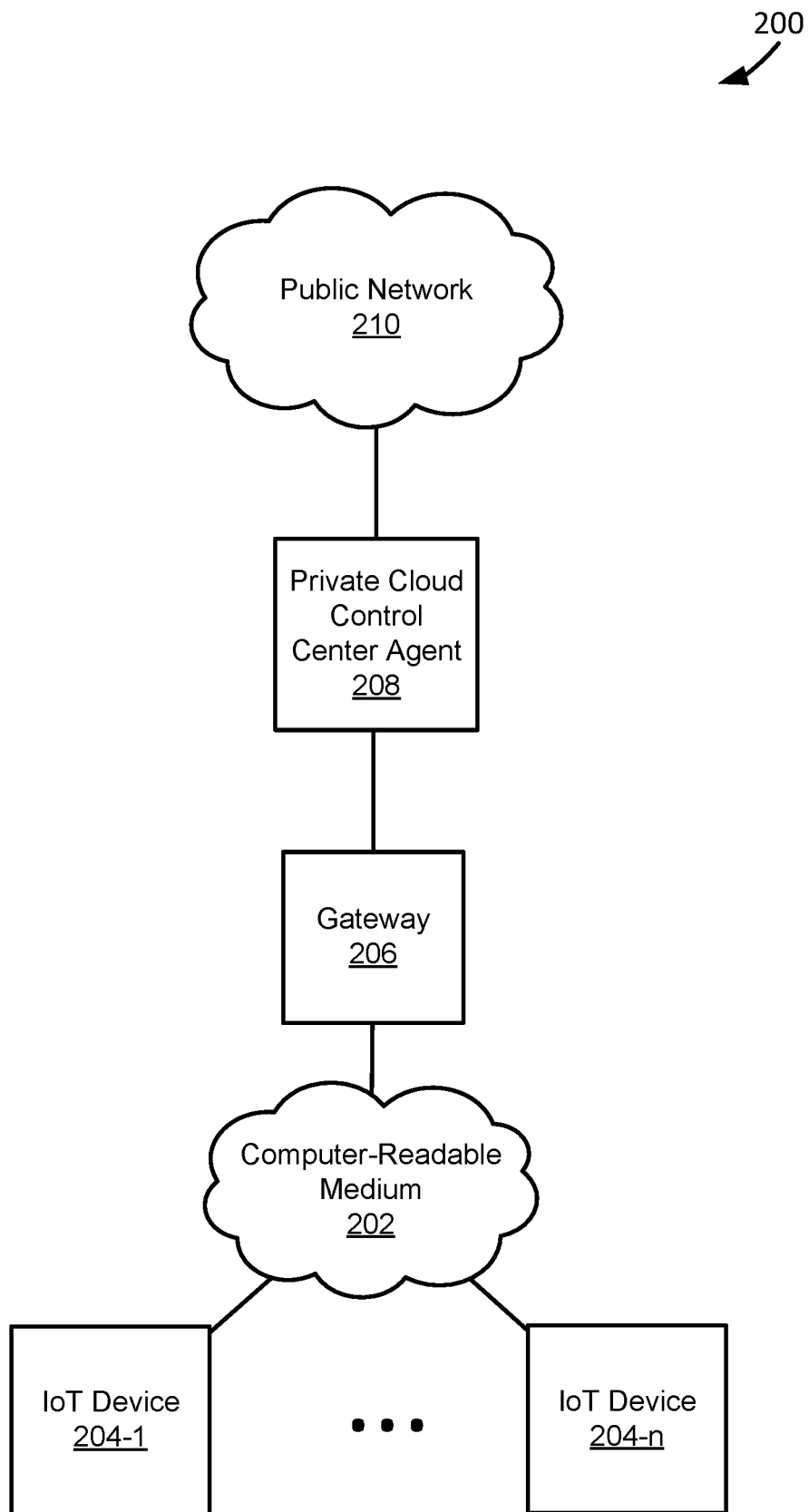
FIG. 2 depicts a diagram of an example of a system for managing IoT devices through a private cloud.

FIG. 2 depicts a diagram 200 of an example of a system for managing IoT devices through a private cloud. The system of the example of FIG. 2 includes a computer-readable medium 202, IoT device 204-1 . . . 204-n (hereinafter referred to as "IoT devices 204") coupled to the computer-readable medium 202, a gateway 206 coupled to the computer-readable medium 202, a private cloud control center agent 208 coupled to the gateway 206, and a public network 210 coupled to the private could control center agent 208. Depending upon implementation-specific or other considerations, the private cloud control center agent 208 can be coupled to the gateway 206 through the computer-readable medium 202 and, alternatively or in addition, to the public network 210 (e.g., "in the cloud").

In the example of FIG. 2, the computer-readable medium 202, and other computer readable mediums discussed in this paper, are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 202 and other computer readable mediums discussed in this paper are intended to represent a variety of potentially applicable technologies. For example, the computer-readable medium 202 can be used to form a network or part of a network. Where two components are co-located on a device, the computer-readable medium 202 can include a bus or other data conduit or plane. Where a first component is co-located on one device and a second component is located on a different device, the computer-readable medium 202 can include a wireless or wired back-end network or LAN. The computer-readable medium 202 can also encompass a relevant portion of a WAN or other network, if applicable.

The computer-readable medium 202, the IoT devices 204, the gateway 206, the private cloud control center agent 208, the public network 210 and any other applicable systems or devices described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor.

The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Referring once again to the example of FIG. 2, the IoT devices 204 function to send and receive data through a network. The IoT devices 204 include wired or wireless interfaces through which the IoT devices 204 can send and receive data over wired and wireless connections. Examples of IoT devices 204 include thermostats, mobile devices, smart phones, tablets, biological managers, sensory devices, and functionality performing devices. The IoT devices 204 include unique identifiers which can be used in the transmission of data through a network. Unique identifiers of the IoT devices 204 can include identifiers created in accordance with Internet Protocol version 4 (hereinafter referred to as "IPv4"), or identifiers created in accordance with Internet Protocol version 6 (hereinafter referred to as "IPv6"), of which both protocol versions are hereby incorporated by reference. Depending upon implementation-specific or other considerations, the IoT devices 204 can include applicable communication interfaces for receiving and sending data according to an applicable wireless device protocol. Examples of applicable wireless device protocols include Wi-Fi, ZigBee, Bluetooth®, and applicable low-power communication standards.

In the example of FIG. 2, the gateway 206 functions to transmit data to and from the IoT devices 204. Depending upon implementation-specific or other considerations, the gateway 206 can include a wired and/or a wireless communication interface for transmitting data to and from the IoT devices 204 over either or both a wired communication channel and a wireless communication channel. The gateway 206 can be a device provided by an Internet service provider and/or directly purchased by a consumer and acting as a conduit between networks. Depending upon implementation or other considerations, the gateway 206 can be used in transmitting data as part of a private cloud. A private cloud maintained through the gateway 206 can be specific to an entity. The gateway 206 can function according to applicable protocols for forming part of a wireless network, including Wi-Fi, such as the IEEE 802.11 standards, which are hereby incorporated by reference.

In a specific implementation, the gateway 206 is wirelessly coupled through a Wi-Fi connection to the IoT devices 204, which act as or include stations. A station, as used in this paper, can be referred to as a device with a media access control (MAC) address and a physical layer (PHY) interface to a wireless medium that complies with the IEEE 802.11 standard. Thus, for example, the network devices can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium. In a specific implementation, the gateway 206 is also implemented as a station, such as an access point (AP) station.

In a specific implementation, the gateway 206 is compliant with IEEE 802.3. IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In the example of FIG. 2, the private cloud control center agent 208 functions to manage IoT devices of a private cloud. In managing IoT devices using a private cloud, the private cloud control center agent 208 can transmit data to a specific entity using a private cloud implemented, at least in part, through the public network 210. Depending upon implementation-specific or other considerations, the public network 210 can be implemented as part of either or both a LAN and a WAN. The private cloud control center agent 208 can be implemented as part of one or an applicable combination of the IoT devices 204, the gateway 206, the public network 210, a private cloud which the private cloud control center agent 208 manages, and an application accessible by an administrator. For example, the private cloud control center agent 208 can be implemented, in part, through a mobile application executed at a mobile device of an administrator. In the implementation where a private cloud maintained through a gateway is specific to a family, an administrator can be a parent.

In a specific implementation, the private cloud control center agent 208 can manage the IoT 204 devices using IoT device data. IoT device data can specify device profiles of the IoT devices 204. Device profiles can include usage behaviors of the IoT devices 204, identifications/credentials of the IoT devices 204, device types of the IoT devices 204, firmware versions of the IoT devices 204, and/or manufacturers of the IoT devices 204. Usage behaviors can include an amount of data sent to and received by the IoT devices 204, traffic flows of data sent to and received by the IoT devices 204, applications executed by the IoT devices 204, users of the IoT devices, specific applications executed by a specific user, and/or times at which specific applications are executed by the IoT devices 204, specific parameters of the IoT devices 204 at specific times, and times the IoT devices 204 operate. For example, usage behaviors of an IoT device that is a thermostat can include what temperatures the thermostat are set to at specific times. In another example, usage behaviors of an IoT devices that is a smart TV can include what media is watched at specific times through the smart TV and what servers the smart TV interacts with a specific times.

In a specific implementation, IoT device data can specify user profiles of people or entities utilizing IoT devices. User profiles can specify IoT devices utilized by a user, times at which IoT devices are utilized by a user, locations, both physical and network, where an IoT device is utilized by a user, and proximities to a networking device when an IoT device is utilized by a user. For example, user profiles can specify that a parent used a smart TV at 8 in the evening. Depending upon implementation-specific or other considerations, user profiles can be utilized to generate device profiles of IoT devices. For example, user profiles can be merged to determine when a specific device is used. Further depending upon implementation-specific or other considerations, user profiles can be merged with device profiles to generate instances of a specific IoT device. Instances of an IoT device can specify who was using the IoT device, a time the IoT device was used, a location of the IoT device when it was used, and proximity of the IoT device to a network device when the IoT device was used. Either or both device profiles and user profiles can be used to create other types of profiles, e.g. time-based behavior profiles of IoT devices, traffic-based behavior profiles of IoT devices, location-based behavior profiles, and proximity-based behavior profiles. For example, a location-based behavior profile can specify times at which specific devices are used at a specific location, e.g. physical or network location.

In a specific implementation, device profiles and/or user profiles include Internet access profiles. Internet access profiles can include traffic locations, data traffic patterns, and authorized traffic locations of systems that can be accessed as part of the Internet. For example, Internet access profiles of IoT devices can include uniform resource locators utilized by an IoT device or a user, ports utilized by an IoT device or a user, frequency of use, duration of use, throughput, hosts an IoT device or a user can access, and what hosts are allowed to access an IoT device. In another example, an Internet access profile can indicate that an IoT device is only allowed to communicate with other specific IoT devices.

In a specific implementation, device profiles and/or user profiles include intranet access profiles. Intranet access profiles can include traffic locations, data traffic patterns, and authorized traffic locations of systems that can be access through as part of an intranet formed, at least in part, through a private cloud. For example, intranet access profiles of IoT devices can specify IoT devices that can be accessed by specific IoT devices as part of an Intranet. In another example, an intranet access profile of a thermostat can specify that the thermostat is only allowed to access an IoT device of an administrator of a private cloud.

In a specific user profiles and/or device profiles are categorized intro groups, as included as part of IoT device data. User profiles can be grouped with other user profiles or device profiles while device profiles can be grouped with other device profiles or user profiles. For example, user profiles of all salespeople within an organization can be grouped together. In another example, all devices of all salespeople within an organization can be grouped together within a user and device group. User profiles and/or device profiles can be grouped according to corresponding Internet access profiles. For example, user profiles can be grouped according to access privileges of a user.

The private cloud control center agent 208 can include an open API for accessing resources and devices managed by the private cloud control center agent 208. In various implementations, an open API can be used by IoT devices managed by the private cloud control center agent 208 to access resources through a private cloud utilized by the private cloud control center agent 208. For example, if a first IoT device managed by the private cloud control center agent 208 stores data in a private cloud, then a second IoT device managed by the private cloud control center agent 208 can access the data in the private cloud through the open API. In another example, a first IoT device managed by the private cloud control center agent 208 can send data to a second IoT device managed by the private cloud control center agent 208 through the private cloud using the open API. Further, in various implementations, an open API can be used by third parties on the Internet to access resources through a private cloud utilized by the private cloud control center agent 208. For example, a provider of a thermostat can access a thermostat managed through a private cloud through the private cloud control center agent 208 to update software, potentially including firmware of the thermostat.

In a specific implementation, the private cloud control center agent 208 functions to onboard the IoT devices 204 for management through a private cloud. The private cloud control center agent 208 can open an API to control access to a private cloud to expose the IoT devices 204. The private cloud control center agent 208 can onboard the IoT devices 204 the first time that the IoT devices 204 become coupled to the gateway 206. Depending upon implementation-specific or other considerations, in onboarding the IoT devices 204, the private cloud control center agent 208 can receive a connection request from the IoT devices 204 or send a connection request to the IoT devices 204 through the gateway 206. Further, in onboarding the IoT devices 204, the private cloud control center agent 208 can determine identifications/credentials of the IoT devices 204 and store the determined identifications/credentials as IoT device data for future authentication of the IoT devices 204. Examples of identifications/credentials of the IoT devices 204 include serial numbers, MAC addresses, Bluetooth® pairing codes, Wi-Fi encryption keys, and security keys. For example, the private cloud control center agent 208 can determine a MAC address of a mobile device and store the MAC address as device data for the mobile device. The private cloud control center agent 208 can store IoT device data in a datastore that can be accessed by applicable systems and/or devices, including other IoT devices, for use in managing IoT devices through a private cloud.

In a specific implementation, the private cloud control center agent 208 functions to onboard the IoT devices 204 according to an IoT firewall. An IoT firewall, as used in this paper, includes IoT rules for transmission of data through a private cloud in managing the IoT devices 204. IoT rules can include what IoT devices can be onboarded or authenticated, what types of data are allowed to be transferred through a private cloud for managing and onboarding IoT devices, what destinations IoT devices are allowed to send data to and receive data from, an amount of bandwidth IoT devices are allowed to use, times when IoT devices can send and receive data, and an amount of data IoT devices are allowed to send and receive. For example IoT rules can specify that a Nest® thermostat and a TV cannot send data between each other. IoT rules can be specific to an IoT device and/or a user of an IoT device. For example, IoT rules can specify that a smart TV is allowed to send and receive as much data as it needs to and from any source, while a thermostat is only allowed to send and receive data to and from an administrator. In another example, IoT rules can specify that a parent is allowed to send and receive data to and from any source while using a smart TV, while a child is only allowed to send and receive data to and from a child friendly source in using the smart TV. In yet another example, IoT rules can specify that a smart TV is allowed to send and receive as much data as possible, while a thermostat is only allowed to send data to and receive data from an administrator. In various implementations, an IoT firewall can be specific to an entity, a gateway, and/or a location of a gateway or IoT devices. For example an IoT firewall can be specific to a family of people or a home of a person.

In a specific implementation, IoT rules defining an IoT firewall are used to detect and/or prevent attacks on IoT devices. IoT rules can include a block list or a watch list of IP addresses that are not trusted that is used to prevent the transfer of data to and from devices assigned the IP addresses. IP addresses can be included in a block list or a watch list according to IP reputations of the IP addresses.

In a specific implementation, IoT rules defining an IoT firewall are specific to context. Context can include what users are currently using IoT devices, what IoT devices are currently being used, past usage behavior, locations of IoT devices, proximity of IoT devices, and an applicable parameter related to management of IoT devices. For example, IoT rules can specify if a certain user is at home, then only that user is allowed to access a camera.

In a specific implementation, in onboarding the IoT devices 204 according to an IoT firewall, the private cloud control center agent 208 can verify that the IoT devices 204 conform to IoT rules forming the IoT firewall. For example, IoT rules can specify gaining approval from an administrator before onboarding the IoT devices 204, in which case the private cloud control center agent 208 can gain approval from the administrator and subsequently onboard the IoT devices 204. In another example, IoT rules can specify that a specific IoT device of the IoT devices 204 needs to conform to all IoT rules defined for the specific IoT device in order to onboard the device. Depending upon implementation-specific or other considerations, the private cloud control center agent 208 can be configured to onboard or not onboard an IoT device, if the IoT device does or does not conform to IoT rules forming an IoT firewall.

In a specific implementation, in onboarding the IoT devices 204 according to an IoT firewall, the private cloud control center agent 208 functions to decrease the risk of rogue IoT devices being used. Specifically, if an IoT firewall specifies specific devices, or IoT devices of specific users, which can be onboarded for management through a private cloud, the private cloud control center agent 208 can prevent rogue IoT devices from coupling to the gateway 206 and gaining access to the private cloud, and subsequently other IoT devices managed through the private cloud. For example, if a hacker places an IoT device within range of the gateway 206 to gain access to a private cloud, the private cloud control center agent 208 can recognize, based on the IoT firewall, the IoT device is not authorized for onboarding, and prevent the IoT device from connecting and becoming a rogue IoT device. In various implementations, a rogue IoT device can include a device not authorized to be managed through a private cloud or an IoT device that includes installed malware.

In a specific implementation, the private cloud control center agent 208 functions to detect rogue IoT devices based on detection of abnormal behavior. Behavior can be determined to be abnormal based on data and data traffic for an IoT device. For example, if a large amount of data is being sent to an IoT device, then the private cloud control center agent 208 can determine that the IoT device is exhibiting abnormal behavior. The private cloud control center agent 208 can determine that behavior exhibited by an IoT device is abnormal by one or an applicable combination of a comparison with past behavior of the IoT device, a comparison with other IoT devices managed by the private cloud control center agent 208, a comparison with other IoT devices of the same type, and a comparison with IoT devices used by other users, as indicated by IoT device data. For example, the private cloud control center agent 208 can determine that IoT device behavior is abnormal if the IoT device is using substantially more data than previously used, as indicated by IoT device data.

In a specific implementation, the private cloud control center agent 208 functions to authenticate the IoT devices 204 for management through a private cloud. The private cloud control center agent 208 can authenticate the IoT devices 204 when the IoT devices 204 reconnect to the gateway 206. Depending upon implementation-specific or other considerations, the private cloud control center agent 208 can authenticate the IoT devices 204 according to an IoT firewall. For example, the private cloud control center agent 208 can determine if the IoT devices 204 are acting in conformity with IoT rules forming an IoT firewall before authenticating the IoT devices 204 for management through a private cloud. The private cloud control center agent 208 can utilize IoT device data in authenticating the IoT devices 204. For example, the private cloud control center agent 208 can use identifications/credentials of the IoT devices 204 to determine IoT rules specific to the IoT devices 204 for authentication purposes.

In a specific implementation, in managing the IoT devices 204, the private cloud control center agent 208 can regulate the flow of data according to an IoT firewall. Depending upon implementation-specific or other considerations, the private cloud control center agent 208 can regulate the flow of data to and from sources in the public network 210 outside of a private cloud. For example, if an IoT firewall specifies to not transmit data from a specific source, the private cloud control center agent 208 can stop transmission of data from the specific source into either or both a private cloud and the IoT devices 204, thereby eliminating exposure of either or both the private cloud and the IoT devices 204 to the specific source. Further depending upon implementation-specific or other considerations, the private cloud control center agent 208 can manage the flow of data to and from the IoT devices 204. For example, if an IoT firewall specifies not to allow an application to be executed on an IoT device, and the private cloud control center agent recognizes data is being sent to the device for execution of the application, then the private cloud control center agent 208 can block transmission of the data to the IoT device. In another example, if an IoT firewall specifies not to allow two specific IoT devices to exchange data between each other, and the private cloud control center agent 208 recognizes that the two specific IoT devices are attempting to exchange data, then the private cloud control center agent can block the exchange of data between the two specific IoT devices.

In a specific implementation, the private cloud control center agent 208 functions to create an application profile signature of an application. An application profile signature of an application can be used by the private cloud control center agent 208 to determine, based on transmitted data, when the application is executing or beginning to be executed on the IoT devices 204. An application profile signature can include a unique identifier of actual data transmitted, a pattern in which the data is transmitted, and/or a volume of transmitted data which uniquely identifies that the application is executing or will be executed on an IoT device. For example, an application profile signature can include a unique header to a data packet indicates that a specific application is being executed. An application profile signature can be used to manage the IoT devices 204 according to an IoT firewall. For example, if an IoT firewall specifies that an IoT device is not allowed to execute a web browsing application, and an application profile signature indicates that the IoT device is attempting to receive data for executing the web browsing application, then the private cloud control center agent can block transmission of the data to the IoT device. An application profile signature can be used to generate and/or update a device profile of an IoT device.

In a specific implementation, the private cloud control center agent 208 functions to create device profiles, included as part of IoT device data, for the IoT devices 204. The private cloud control center agent 208 can generate a device profile by monitoring traffic to and from the IoT devices 204. Depending upon implementation-specific or other considerations, the private cloud control center agent 208 can use an application profile signature to generate a device profile. For example, if a specific data packet is sent to an IoT device and an application profile signature of a specific application indicates that the specific data packet is used in executing the specific application, then the private cloud control agent 208 can generate a device profile for the IoT device indicating that the specific application is executed on the IoT device.

In a specific implementation, the private cloud control center agent 208 functions to generate and/or update an IoT firewall. For example, the private cloud control center agent 208 can generate an IoT firewall by generating IoT rules specifying which types of data are allowed to be sent to the IoT devices 204. Depending upon implementation-specific or other considerations, the private cloud control center agent 208 can generate and/or update an IoT firewall based on input from an administrator. For example, an administrator can input that a specific IoT device is not allowed to be managed through the private cloud and the private cloud control center agent 208 can update an IoT firewall to include not allowing the specific IoT device to connect to the gateway 206. Further depending upon implementation-specific or other considerations, the private cloud control center agent 208 can generate and/or update an IoT firewall based on a device profile of an IoT device. For example, if a device profile of an IoT device indicates that an application is frequently executed on the IoT device, then the private cloud control center agent 208 can update an IoT firewall to include always allowing the IoT device to send and receive data used in executing the application.

Making reference to the example of FIG. 1 to describe an example of operation of the system, the IoT devices become wirelessly coupled to the gateway 206. In this example of operation, the private cloud control center agent onboards or authenticates the IoT devices for management through a private cloud. The private cloud control center agent 208 manages, through the application of an IoT firewall, the transmission of data to and from the IoT devices 204 to the public network 210 and/or other IoT devices.

Figure 3:
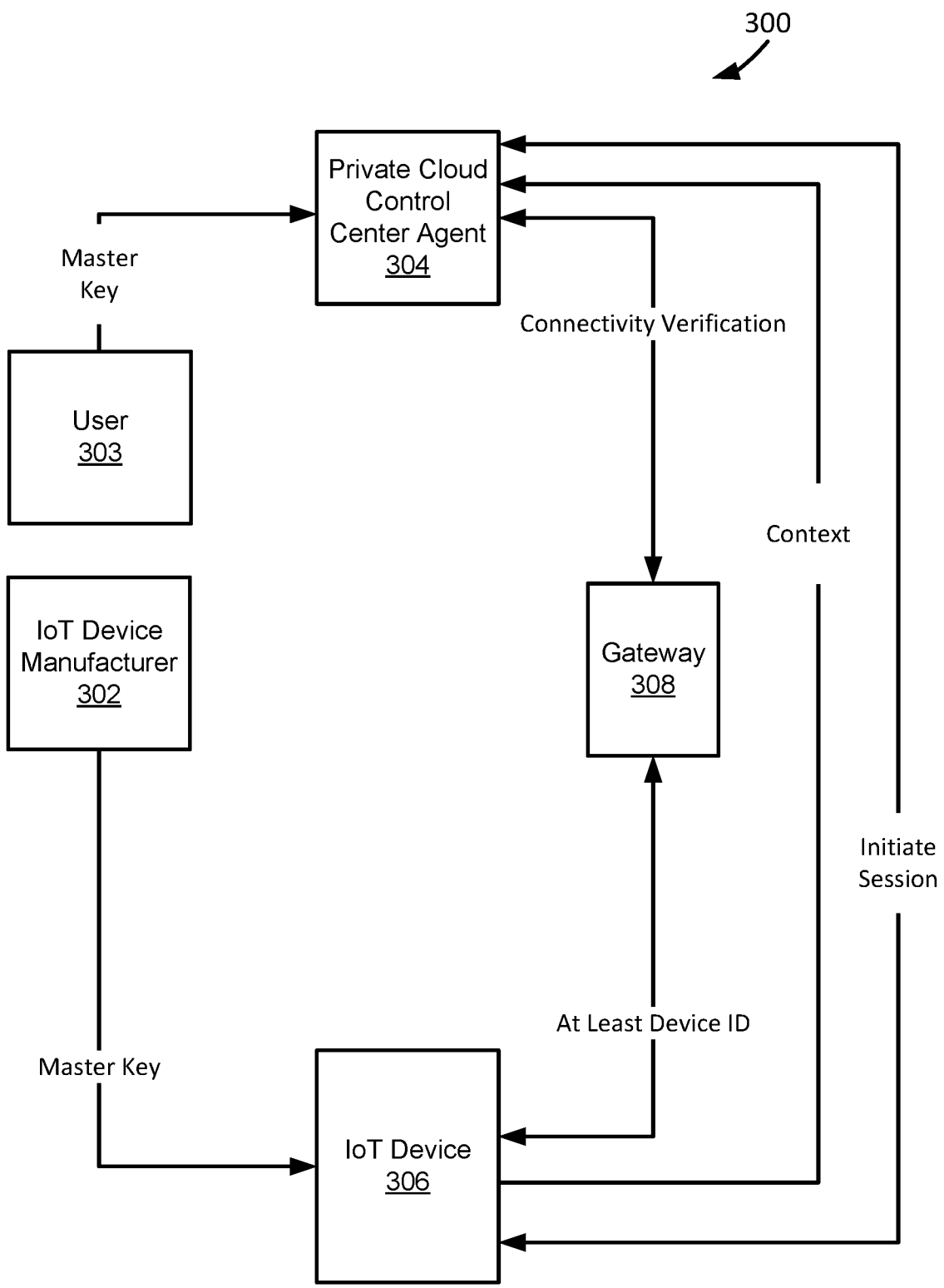
FIG. 3 depicts diagram of a system for seamless onboarding of an IoT device.

FIG. 3 depicts diagram 300 of a system for seamless onboarding of an IoT device. In onboarding an IoT device seamlessly, a user does not have to configure the IoT device in order to onboard the IoT device. The example system shown in FIG. 3 includes an IoT device manufacturer 302, a user 303, a private cloud control center agent 304, an IoT device 306, and a gateway 308.

The IoT device manufacturer 302 functions to manufacture IoT devices. The IoT device manufacturer 302 can include a device ID or a master key with an IoT device used in onboarding an IoT device. Depending upon implementation-specific or other considerations, the IoT device manufacturer 302 can provide the device ID or master key to an applicable system for onboarding and/or authenticating an IoT device for a network, such as the private cloud control center agents described in this paper or the users described in this paper. Further depending upon implementation-specific or other considerations, the IoT device manufacturer can provide the device ID or master key to a user, e.g. as a QR code which can be scanned by a user and provided to an applicable system for authenticating or onboarding an IoT devices, such as the private cloud control center agents described in this paper. The IoT device manufacturer 302 can configure IoT devices to provide a device ID or a master key as soon as the IoT device becomes coupled to a network. In various implementations, the IoT device manufacturer 302 can program a device ID or session key into memory of IoT devices.

The user 303 functions to provide a master key to an applicable system for onboarding or authenticating an IoT device, such as the private cloud control center agents described in this paper. The user 303 can obtain a master key from an IoT device manufacturer of an IoT device that a user is attempting to onboard. Depending upon implementation-specific or other considerations, the user can provide a master key to a system for onboarding or authenticating an IoT device through an applicable method of providing a master key, for example by scanning a QR code provided by an IoT device manufacturer or entering a password provided by an IoT device manufacturer.

The private cloud control center agent 304 functions according to an applicable system for managing IoT devices using a private cloud, such as the private cloud control center agents described in this paper. The private cloud control center agent 304 can onboard/authenticate IoT devices and manage data traffic to and from the IoT devices according to an IoT firewall, thereby creating a private cloud. Depending upon implementation-specific or other considerations, the private cloud control center agent 304 can receive a master key of an IoT device from the IoT device manufacture 302 or the user 303, for use in onboarding the IoT device for sending and receiving data through a private cloud. For example, the private cloud control center agent 304 can use a master key of an IoT device to establish a secure communication channel through which the IoT device can be onboarded/authenticated. Further depending upon implementation-specific or other considerations, the private cloud control center agent 304 can onboard/authenticate an IoT device using a shared secret, e.g. a pre-shared key four way authentication method or a private pre-shared key four way authentication method.

The IoT device 306 functions according to an applicable IoT device, such as the IoT devices described in this paper. The IoT device 306 can couple to the gateway 308 for onboarding and subsequently sending and receiving data. In various implementations, the IoT device 306 can be coupled to the gateway 308 through a wireless connection. The IoT device 306 is manufactured by the IoT device manufacturer 302 and includes a device ID or a master key used to seamlessly onboard the IoT device 306. The IoT device 306 is configured to provide either or both a device ID and a master key to a gateway for use in onboarding the IoT device. In various implementations, the IoT device 306 can automatically provide a device ID and/or a master key to the gateway 308 after becoming coupled to it, or provide a device ID and/or master key after being queried by the gateway 308. A master key used in onboarding the IoT device 306 can be used to generate a session key the IoT device 306 can be used to generate a session key in authenticating the IoT device 306 during a session.

The gateway 308 functions according to an applicable system for transmitting data to and from the IoT device 306, such as the gateways described in this paper. The gateway 308 can provide a device ID and/or a master key retrieved from the IoT device 306 to the private cloud control center agent 304 for establishing connection verification between the private cloud control center agent 304 and the IoT device 306. Depending upon implementation-specific or other considerations, the private cloud control center agent 304 can match a device ID and/or a master key provided by the IoT device 306 through the gateway 308 to a master key provided by the IoT device manufacturer 302 or the user 303 to subsequently verify a connection with the IoT device 306. For example, if a master key provided by the user 303 matches a master key and/or a device ID provided by the IoT device 306, then the private cloud control center agent 304 can determine to verify a connection with the IoT device 306.

In a specific implementation, the IoT device 306 functions to provide context of the IoT device 306 to the private cloud control center agent 304 used in onboarding and/or authenticating the IoT device 306. The IoT device 306 can provide context of the IoT device 306 to the private cloud control center agent 304 for onboarding/authenticating the IoT device 306 after a connection is verified with the IoT device 306 between the private cloud control center agent 304 and the IoT device 306. Examples of context of the IoT device 306 include attributes of an IoT device, a time at which an IoT device is attempting to connect, a location of an IoT device attempting to connect, a proximity to a gateway or an agent of an IoT device attempting to connect, and user info of a user an IoT device attempting to connect.

In a specific implementation, the private cloud control center agent 304 functions to establish a session according to a context of the IoT device 306. In establishing a connection of the IoT device 306, the private cloud control center agent 304 can initiate a session according to rules based on a context of the IoT device 306. For example, if the IoT device 306 sends context indicating it is of a certain device type, then the private cloud control center agent 304 can establish a connection based on the device type.

In an example of operation of the example system shown in FIG. 3, the IoT device manufacturer 302 assigns a session key including a device ID to the IoT device 106. In the example of operation of the example system shown in FIG. 3, the user 303 provides the session key to the private cloud control center agent 304. Further, in the example of operation of the example system shown in FIG. 3, the IoT device provides the device ID to the private cloud control center agent 304 through the gateway 308. In the example of operation of the example system shown in FIG. 3, the private cloud control center agent 304 establishes a connection verification using the session key provided by the user 303 and the device ID provided by the IoT device 306. Additionally, in the example of operation of the example system shown in FIG. 3, the IoT device 306 provides a context of the IoT device 306 to the private cloud control center agent 304. In the example of operation of the example system shown in FIG. 3, the private cloud control center agent 304 initiates a session with the IoT device 306 based on the context of the IoT device 306.

Figure 4:
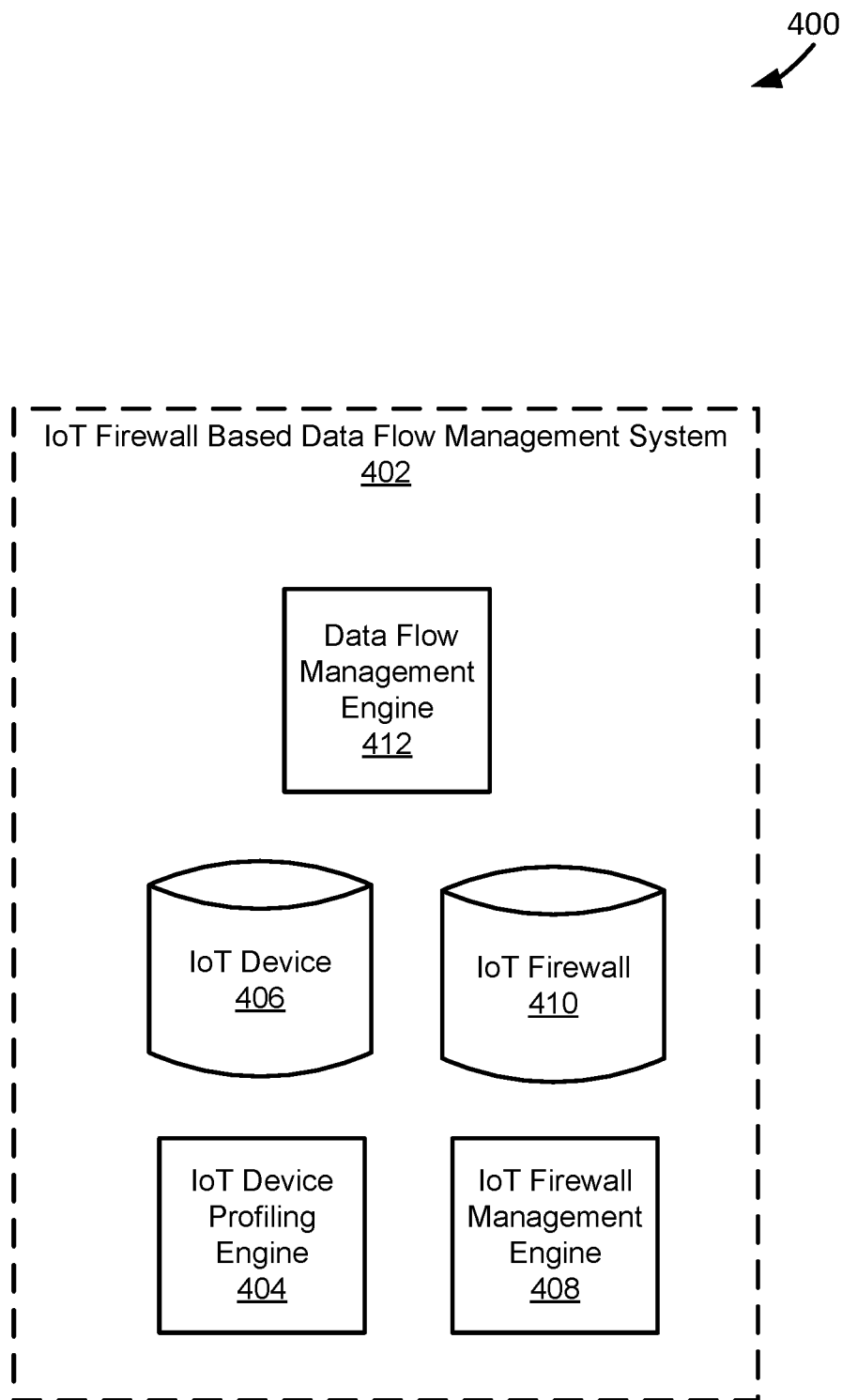
FIG. 4 depicts a diagram of an example of an IoT firewall based data flow management system for controlling data transmitted to and from IoT devices according to an IoT firewall.

FIG. 4 depicts a diagram 400 of an example of an IoT firewall based data flow management system 402 for controlling data transmitted to and from IoT devices according to an IoT firewall. The IoT firewall based data flow management system 402 can be integrated as part of an applicable system for managing IoT devices using a private cloud, such as the private cloud control center agents described in this paper. The IoT firewall based data flow management system 402 can generate and/or update a device profile of managed IoT devices and generate and update an IoT firewall applied to the managed IoT devices. The IoT firewall based data flow management system 402 can also control transmission of data to and from managed IoT devices through application of an IoT firewall. Depending upon implementation-specific or other considerations, the IoT firewall based data flow management system 402 can control transmission of data between managed IoT devices. For example, if a first managed IoT device is a Nest® thermostat and a second managed IoT device is a television, the IoT firewall based data flow management system 402 can block data from being transmitted between the thermostat and the television. Further depending upon implementation-specific or other considerations, the IoT firewall based data flow management system 402 can control transmission of data between a managed IoT device and a public network. For example, the IoT firewall based data flow management system 402 can block an IoT device from sending data to or receiving data from a specific server through a public network.

The IoT firewall based data flow management system 402 includes an IoT device profiling engine 404, an IoT device datastore 406, an IoT firewall management engine 408, an IoT firewall datastore 410, and a data flow management engine 412. The IoT device profiling engine 404 functions to generate and/or update a device profile of an IoT device. A device profile can include both static data and dynamic data describing an IoT device. Static data describing an IoT device includes characteristics of an IoT device that do not change over time. For example, static data can include systems and other IoT devices an IoT interacts with, users of the IoT device, and/or a device type of the IoT device. Dynamic data describing an IoT device includes characteristics of an IoT device that change over time. For example, dynamic data can include data usage of an IoT device over time. In various implementations, the IoT device profiling engine 404 can generate and/or an update a device profile by monitoring data transmitted to and from an IoT device.

In a specific implementation, the IoT device profiling engine 404 functions to determine a device type of an IoT device. A device type of an IoT device can include a manufacturer of the IoT device, a function performed by the IoT device, and/or a version of the IoT device. For example, a device type of an IoT device can include that the IoT device is an iPhone® 6. The IoT device profiling engine 404 can determine a device type of an IoT device based on a packet signature of a data packet sent to or received from the IoT device. For example, if a packet sent to an IoT device is for a Nest® thermostat, then the IoT device profiling engine 404 can determine the IoT device is a Nest® thermostat.

In a specific implementation, the IoT device profiling engine 404 functions to determine normal behavior of an IoT device, as part of a device profile for the IoT device. Normal behavior of an IoT device can include an amount of data transmitted to and from the IoT device, times at which data is transmitted, Internet access behaviors of the IoT device, and/or sources data is transmitted to and from the IoT device. For example if an IoT device frequently send and receive data from a specific server, then it can be normal behavior of the IoT device to communicate with the specific server. Internet access behaviors can include sites an IoT device visits, a frequency at which the IoT device visits the sites, times at which the IoT device visits the sites, and/or an amount of data transmitted between the IoT device and the sites. Normal behavior of an IoT device can be specific to the IoT device, a user of the IoT device, a function an IoT device is performing, and/or a specific time the IoT device is operating.

In a specific implementation, the IoT device profiling engine 404 functions to determine normal behavior of an IoT device by monitoring data transmitted to and from the IoT device. For example, the IoT device profiling engine 404 can monitor data transmitted from an IoT device to determine destinations which communicate with the IoT device. In various implementations, the IoT device profiling engine 404 can apply analytics to generate models of normal behavior of an IoT device. Normal behavior of an IoT device can be updated/modified over time by the IoT device profiling engine 404 based on data traffic to and from the IoT device.

The IoT device datastore 406 functions to store IoT device data indicating device profiles of IoT devices. IoT device data stored in the IoT device datastore 406 can be generated and/or modified by the IoT device profiling engine 404. For example, the IoT device datastore 406 can store IoT device data for an IoT device as the IoT device profiling engine 404 modifies the IoT device data of the IoT device over time. Depending upon implementation-specific or other considerations, the IoT device datastore 406 can store IoT device data of IoT devices according to one or a combination of a device type of the IoT devices, a user of the IoT devices, functions of the IoT devices, an entity the IoT devices are associated with, and/or a private cloud associated with the IoT devices. For example, the IoT device datastore 406 can store all IoT device data of all IoT devices associated with an entity with a single identifier of the entity.

The IoT firewall management engine 408 functions to manage an IoT firewall applied to IoT devices. The IoT firewall management engine 408 can update and/or generate IoT rules for an IoT firewall. IoT rules can be specific to an IoT device, a user of an IoT device, a specific time an IoT device is functioning, and/or a specific function performed by an IoT device. For example, IoT rules can specify that a first IoT device is not allowed to communicate with a second IoT device.

In a specific implementation, the IoT firewall management engine 408 can generate and/or update IoT rules based on input. The IoT firewall management engine 408 can generate and/or update IoT rules based on input received from an administrator, a manufacturer of an IoT device, and/or a user associated with an entity. For example, input from a parent can specify that a child is not allowed to visit certain sites using an IoT device. In another example, input from a manufacturer can specify that an IoT device is allowed to communicate with the manufacturer for updates.

In a specific implementation, the IoT firewall management engine 408 can generate and/or update IoT rules based on device profiles included as part of IoT device. Depending upon implementation-specific or other considerations, the IoT firewall management engine 408 can generate and/or update IoT rules based on a device type of an IoT device, as included as part of a device profile. For example, if a device profile of an IoT device indicates that the IoT device is a television, then the IoT firewall management engine 408 can generate and/or update IoT rules to allow the IoT device to send and receive data from streaming video services. Further depending upon implementation-specific or other considerations, the IoT firewall management engine 408 can generate and/or update IoT rules based on normal behavior of an IoT device, as included as part of a device profile of an IoT device. For example, if normal behavior of a first IoT device indicates that the first IoT device communicates frequently with a second IoT device, then the IoT firewall management engine 408 can generate and/or update IoT rules to allow communication between the first IoT device and the second IoT device.

The data flow management engine 412 functions to control data transmitted to and from IoT devices through application of an IoT firewall. The data flow management engine 412 can control transmission of data between IoT devices, and/or IoT devices and a public network. Depending upon implementation-specific or other considerations, the data flow management engine 412 can control transmission of data between IoT devices associated with the same private cloud. For example, the data flow management engine 412 can control transmission of data between a television and a thermostat within the same house.

In a specific implementation, in controlling data transmitted to and from IoT devices, the data flow management engine 412 can intercept data transmitted to and from the IoT devices, and apply an IoT firewall to the data. The data flow management engine 412 can intercept data and apply an IoT firewall to the data before it reaches its intended destination. For example, if a first IoT device is sending data to a second IoT device, the data flow management engine 412 can intercept the data before it is received at the second IoT device and apply an IoT firewall to the data. In applying an IoT firewall to data, the data flow management engine 412 can determine whether to transmit or stop data from being transmitted to an intended destination. For example, if an IoT firewall includes an IoT rule specifying that a first IoT device cannot send data to or receive data from a specific Internet site, the data flow management engine 412 can intercept and drop data traffic sent between the first IoT device and the specific Internet site. Depending upon implementation-specific or other considerations, the data flow management engine 412 can alert a user that data is being transmitted in violation of an IoT firewall and/or query a user whether they want to proceed with transmission of the data.

In a specific implementation, the data flow management engine 412 can modify intercepted data, before it is sent to an intended destination. Depending upon implementation-specific or other considerations, the data flow management engine 412 can intercept and modify data sent from an IoT device before it is sent to a public network. Further depending upon implementation-specific or other considerations, the data flow management engine 412 can intercept and modify data send from one IoT device to another IoT device associated with a private cloud. The data flow management engine 412 can modify intercepted data according to an IoT firewall. In modifying data, the data flow management engine 412 can encrypt data, delete portions of data, and/or rewrite portions of data. For example the data flow management engine 412 can remove or rewrite a header of an HTTP packet to remove a device type, an operating system version, and a firm ware version of an IoT device.

In an example of operation of the example system shown in FIG. 4, the IoT device profiling engine 404 generates device profiles of managed IoT devices. In the example of operation of the example system shown in FIG. 4, the IoT device datastore 406 stores IoT device data indicating the device profiles generated by the IoT device profiling engine 404. Further, in the example of operation of the example system shown in FIG. 4, the IoT firewall management engine 408 generates an IoT firewall to apply in managing the IoT devices. In the example of operation of the example system shown in FIG. 4, the IoT firewall datastore 410 stores IoT firewall data indicating the IoT firewall generated by the IoT firewall management engine 408. Additionally, in the example of operation of the example system shown in FIG. 4, the data flow management engine 412 applies the IoT firewall in managing transmission of data to and from the IoT devices using the IoT device data stored in the IoT device datastore 406 and the IoT firewall data stored in the IoT firewall datastore 410.

Figure 5:
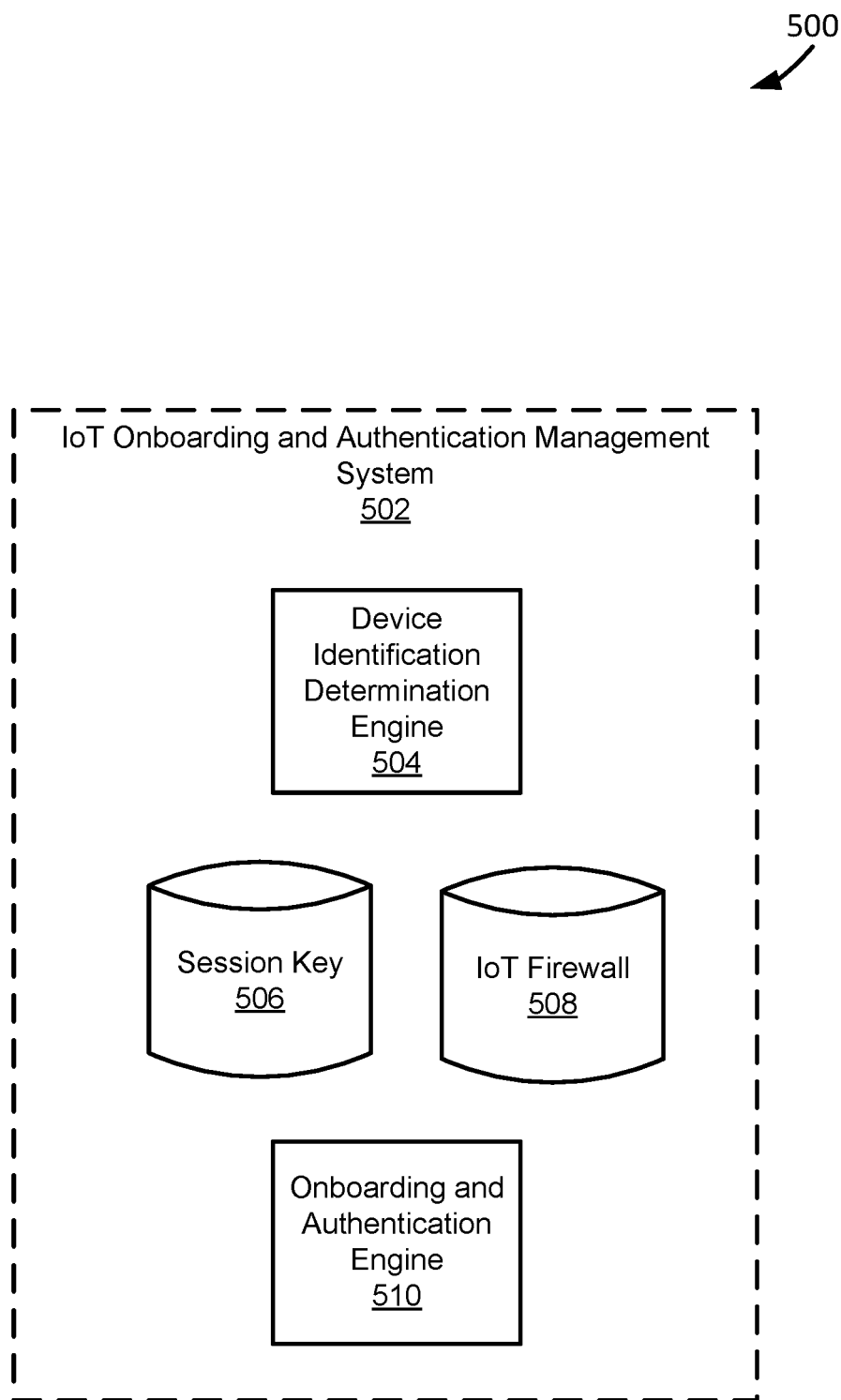
FIG. 5 depicts a diagram of an example of an IoT onboarding and authentication system for onboarding and authenticating IoT devices for management using an IoT firewall.

FIG. 5 depicts a diagram 500 of an example of an IoT onboarding and authentication management system 502 for onboarding and authenticating IoT devices for management using an IoT firewall. The IoT onboarding and authentication management system 502 can be integrated as part of an applicable system for managing IoT devices using a private cloud, such as the private cloud control center agents described in this paper. The IoT onboarding and authentication management system 502 can determine an identification of an IoT device and apply an IoT firewall to the IoT device to determine whether to onboard or authenticate the IoT device. Depending upon implementation-specific or other considerations, the IoT onboarding and authentication management system 502 can compare a password received from an IoT device with a password assigned to the IoT device to provide seamless onboarding or seamless authentication.

The IoT onboarding and authentication management 502 includes a device identification determination engine 504, a session key datastore 506, an IoT firewall datastore 508, and an onboarding and authentication engine 510. The device identification determination engine 504 functions to determine an identification of an IoT device, including a specific identification, specific credentials, and/or a device type of an IoT device. For example, the device identification determination engine 504 can determine a MAC address of an IoT device. Depending upon implementation-specific or other considerations, the device identification determination engine 504 can determine an identification of an IoT device from data received from the IoT device and/or IoT device data for the IoT device. For example, the device identification determination engine 504 can determine an identification of an IoT device from data transmitted from an IoT device if it is included as part of a header of an HTTP packet sent from the IoT device. Further depending upon implementation-specific or other considerations, the device identification determination engine 504 determines an identification of an IoT device by querying the IoT device. For example, the device identification determination engine 504 can ask an IoT device to return its device credentials after it becomes coupled for management.

The seamless onboarding datastore 506 functions to store session key data. Session key data can include session keys or identifications assigned to an IoT device by a manufacturer. Session key data stored in the seamless onboarding datastore 506 can be used to seamlessly onboard an IoT device for management through application of an IoT firewall. Depending upon implementation-specific or other considerations, a manufacturer of an IoT device or a user of an IoT device can provide session key data stored in the seamless onboarding datastore 506.

The IoT firewall datastore 508 functions according to an applicable datastore for storing IoT firewall data of IoT firewalls applied to IoT devices, such as the IoT firewall datastores described in this paper. IoT firewall data store in the IoT firewall datastore 508 can be generated by an applicable system for generating IoT firewall data, such as the IoT firewall management engines described in this paper. Depending upon implementation-specific or other considerations, IoT firewall data stored in the IoT firewall datastore 508 can be generated in response to input received from an administrator, device profiles of IoT devices, and/or input received from a manufacturer of the IoT devices.

The onboarding and authentication engine 510 functions to onboard and authenticate IoT devices for management through application of an IoT firewall. Depending upon implementation-specific or other considerations, the onboarding and authentication engine 510 can onboard an IoT device the first time it is coupled for management. Further depending upon implementation-specific or other considerations, the onboarding and authentication engine 510 can authenticate an IoT device after it has been onboarded during a previous session and is coupled for management during a subsequent session.

In a specific implementation, the onboarding and authentication engine 510 functions to onboard and authenticate IoT devices according to an IoT firewall applied to the IoT devices. In onboarding and/or authenticating an IoT device according to an IoT firewall, the onboarding and authentication engine 510 can apply an IoT firewall to the IoT device based on a determined identification of the IoT device.

Depending upon implementation-specific or other considerations, the onboarding and authentication engine 510 can place an IoT device in an unproven device zone until it is determined the IoT device conforms with an IoT firewall after which the IoT device can be properly onboard and/or authenticated. An unproven device zone can include a network access zone in which restricted access is provided to an IoT device through a private cloud. For example, the onboarding and authentication engine 510 can block all data transfer from IoT devices managed under a private cloud and IoT devices within an unproven device zone. A scope of an unproven device zone is specific to an identification of a device and/or a type of a device. For example, if an IoT device is an administrator device, then the onboarding and authentication engine 510 can adjust a scope of an unproven device zone for the IoT device to include interactions with a subset of IoT devices managed through a private cloud. In various implementations, after an IoT device is onboarded and/or authenticated, the onboarding and authentication engine 510 can remove the IoT device from the unproven device zone and the IoT device can be managed through application of an IoT firewall.

In a specific implementation, the onboarding and authentication engine 510 functions to onboard an IoT device seamlessly using a master key assigned to the IoT device by a manufacture. The onboarding and authentication engine 510 can receive a master key and/or a device ID from an IoT device attempting to onboard. The onboarding and authentication engine 510 can compare a master key and/or device ID received from an IoT device with a master key associated with the IoT device and received from a manufacture or a user to determine whether to onboard the IoT device. If a master key and/or device ID received from an IoT device matches a master key assigned to the IoT device by a manufacturer, then the onboarding and authentication engine 510 can onboard the IoT device seamlessly without requiring any additional input from either or both the IoT device and a user associated with the IoT device. In various implementations, the onboarding and authentication engine 510 can use a master key to establish a secure communication channel through which an IoT device can be authenticate/onboarded through an applicable method, e.g. through a four way pre-shared key handshake method.

In a specific implementation, the onboarding and authentication engine functions to receive a context of an IoT device from the IoT device. The onboarding and authentication engine 510 can use a context of an IoT device to onboard and/or authenticate an IoT device. For example, if a context of an IoT device indicates an IoT device is being used by a specific user, then the onboarding and authentication engine 510 can establish a connection with the IoT device according to an IoT firewall for the specific user.

In an example of operation of the example system shown in FIG. 5, the device identification determination engine 504 determines an identification of an IoT device attempting to be onboarded and/or authenticated for management through a private cloud. In the example of operation of the example system shown in FIG. 5, the session key datastore 506 stores session key data indicating a session key or an identification assigned to the IoT device by a manufacturer of the IoT device. Further, in the example of operation of the example system shown in FIG. 5, the IoT firewall 508 stored IoT firewall data indicating an IoT firewall to apply to the IoT device. In the example of operation of the example system shown in FIG. 5, the onboarding and authentication engine 510 uses session key data stored in the session key datastore 506, and the IoT firewall data stored in the IoT firewall datastore 508 to onboard and/or authenticate the IoT device for management through the private cloud.

Figure 6:
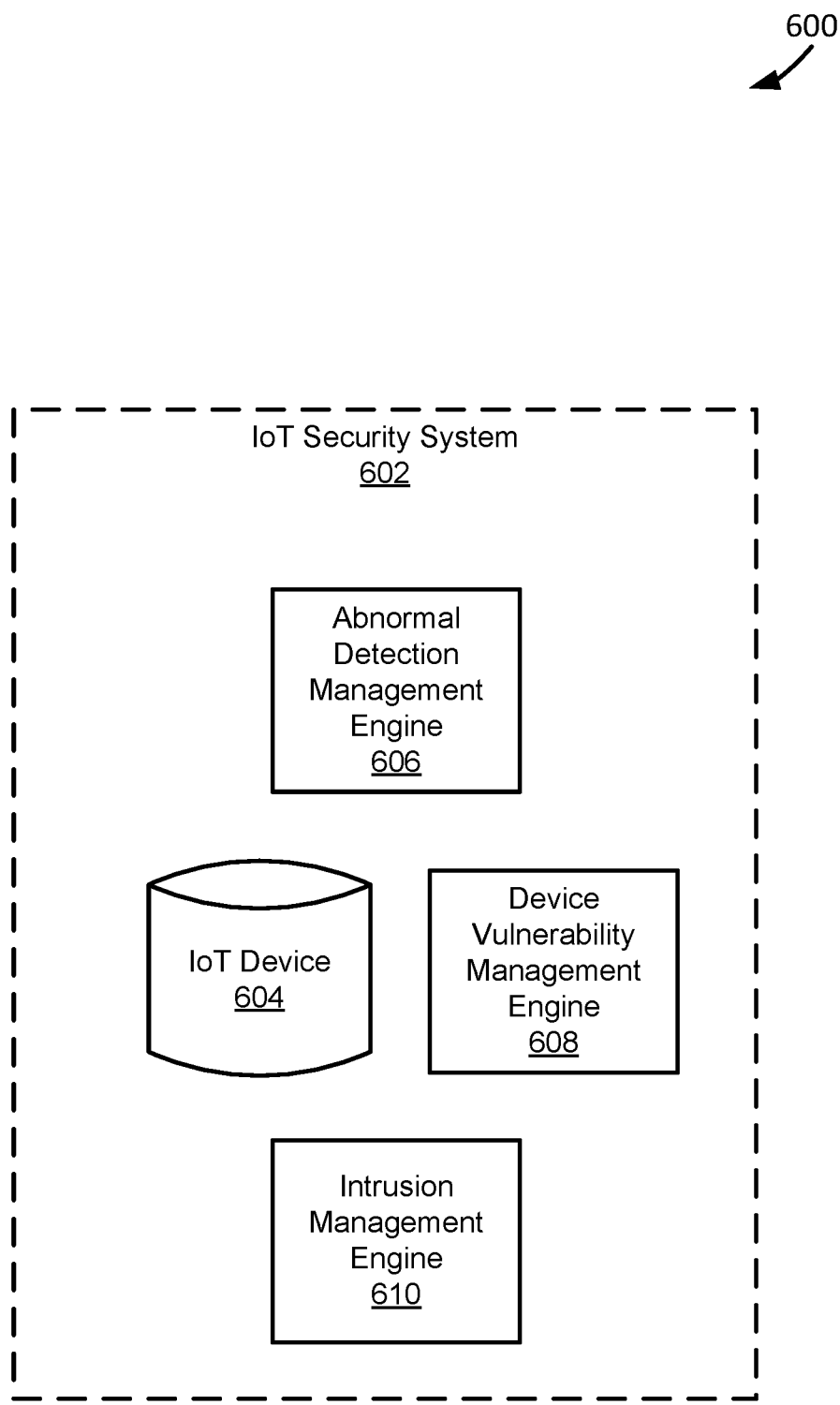
FIG. 6 depicts a diagram of an example of an IoT security system for providing security to IoT devices managed through a private cloud.

FIG. 6 depicts a diagram 600 of an example of an IoT security system 602 for providing security to IoT devices managed through a private cloud. The IoT security system 602 can be integrated as part of an applicable system for managing IoT devices using a private cloud, such as the private cloud control center agents described in this paper. As part of providing security, the IoT security system 602 can function to determine abnormal behavior of a managed IoT device, probe IoT devices to determine device vulnerability, and perform intrusion detection for rogue IoT devices. Further, in providing security, the IoT security system 602 can quarantine IoT devices. As used in this paper, quarantining IoT devices includes blocking all or a portion of traffic sent to and from IoT devices and/or removing an IoT device from quarantine in response to input from a user or an administrator associated with a private cloud used in managing IoT devices.

The IoT security system 602 includes an IoT device datastore 604, an abnormal detection management engine 606, a device vulnerability management engine 608, and an intrusion management engine 610. The IoT device datastore 604 functions according to an applicable datastore for storing IoT device data, such as the IoT device datastore described in this paper. The IoT device datastore 604 can store IoT device data describing normal behavior of IoT devices managed through a private cloud.

The abnormal detection management engine 606 functions to manage detection of abnormal behavior of managed IoT devices. The abnormal detection management engine 606 can monitor behavior of an IoT device and compare the behavior to normal behavior of the IoT device to determine if the IoT device is behaving abnormally. For example, if normal behavior of an IoT device, as indicated by IoT device data, includes an IoT device does not send and receive data during the daytime, and the abnormal detection management engine 606 observes that the IoT device is sending data during the daytime, then the abnormal detection management engine 606 can determine that the IoT device is behaving abnormally. Depending upon implementation-specific or other considerations, the abnormal detection management engine 606 can determine whether an IoT device's behavior is abnormal in continuously real time, at specific set times, and/or once functions being performed at the IoT device are detected. For example, the abnormal detection management engine 606 can determine if an IoT device is exhibiting abnormal behavior every time it sends or receives data.

In a specific implementation, the abnormal detection management engine 606 functions to determine whether an IoT device is behaving abnormally based on the flow of data to and from the device. In various implementations, the abnormal detection management engine 606 can determine whether an IoT device is behaving abnormally by comparing the flow of data to and from the device with Internet access patterns of the IoT device. For example, the abnormal detection management engine 606 can determine that a device is behaving abnormally if it is sending data to an Internet source that it has never sent data to before. In various implementations, the abnormal detection management engine 606 can determine whether an IoT device is behaving abnormally by comparing the flow of data to and from the device with intranet access patterns of the IoT device. For example, the abnormal detection management engine 606 can determined that a device is behaving abnormally if it is sending data to other IoT devices managed through a private cloud, to which the device had not previously sent data. Depending upon implementation-specific of other considerations, the abnormal detection management engine 606 can determine whether an IoT device is behaving abnormally based on a transmitted and received bytes histogram. A transmitted and received bytes histogram can be generated based on packet characteristics, e.g. packet type and sizes, of packets transmitted and received by an IoT device.

In a specific implementation, the abnormal detection management engine 606 can take remedial action in response to detection of abnormal behavior at an IoT device. Remedial actions can include quarantining an IoT device and/or alerting a user associated with a private cloud for managing an IoT device. Depending upon implementation-specific or other considerations, the abnormal detection management engine 606 can automatically quarantine an IoT device after detection of abnormal behavior or quarantine an IoT device in response to instructions received from a user associated with a private cloud for managing the IoT device. For example, upon detection of abnormal behavior, the abnormal detection management engine 606 can inform an administrator of the abnormal behavior of an IoT device, and subsequently quarantine or not quarantine the IoT device in response to instructions received from the administrator.

The device vulnerability management engine 608 functions to manage vulnerability determination of IoT devices managed through a private cloud. Vulnerability of a device can include a chance that a device is subject to corruption or being taken over or managed by a third party. Depending upon implantation-specific or other considerations, the device vulnerability management engine 608 can perform active probing or other simulations of an attack to IoT devices managed through a private cloud. For example, the device vulnerability management engine 608 can simulate an attack of a third party device attempting to gain control of an IoT device by sending data to the IoT device and monitoring the response of the IoT device to determine the vulnerability of the IoT device. Further depending upon implementation-specific or other considerations, the device vulnerability management engine 608 can analyze device characteristics of IoT devices to determine a vulnerability of the IoT devices. For example, the device vulnerability management engine 608 can determine a device is vulnerable if it is running an outdated version of an operating system or firmware.

In a specific implementation, the device vulnerability management engine 608 can take remedial action based on a vulnerability of an IoT device. The device vulnerability management engine 608 can be configured to take remedial action if a vulnerability of an IoT device rises above a threshold vulnerability level. Remedial actions can include quarantining an IoT device and/or alerting a user associated with a private cloud for managing an IoT device. Depending upon implementation-specific or other considerations, the device vulnerability management engine 608 can automatically quarantine an IoT device after a determination that the IoT device is vulnerable or quarantine an IoT device in response to instructions received from a user associated with a private cloud for managing the IoT device. For example, upon determining a vulnerability of an IoT device is above a threshold vulnerability level, the device vulnerability management engine 608 can inform an administrator of the IoT device of a vulnerability level of the IoT device, and subsequently quarantine or not quarantine the IoT device in response to instructions received from the administrator.

The intrusion management engine 610 functions to manage intrusion into a private cloud for managing IoT device. The intrusion management engine 610 can manage intrusion of rogue IoT devices and/or third parties into a private cloud. For example the intrusion management engine 610 can manage intrusion of third party sites attacking or otherwise controlling IoT devices through a public network. For example, the intrusion management engine 610 can prevent transmission of data to IoT devices used in installing malware on the IoT devices to prevent the installation of malware on the IoT devices, subsequently preventing unauthorized control of the IoT devices and use of the IoT devices as Botnets or theft of private information of users of the devices. The intrusion management engine 610 can manage intrusion by detecting a rogue IoT device and/or third party attempting to gain access to a private cloud. Depending upon implementation-specific or other considerations, the intrusion management engine 610 can detect a rogue IoT device and/or third party by monitoring data traffic through a private cloud for managing IoT devices. For example, if the intrusion management engine 610 observes a specific IoT device is attempting to communicate with all or a specific portion of managed devices, then the intrusion management engine 610 can determine that the specific IoT device is a rogue IoT device.

In a specific implementation, the intrusion management engine 610 can take remedial action based on detection of a rogue IoT device or a third party attempting to attack or control IoT devices. Remedial actions can include quarantining a rogue IoT device, blocking traffic to and from a third party, and/or alerting a user associated with a private cloud for managing an IoT device. Depending upon implementation-specific or other considerations, the intrusion management engine 610 can automatically quarantine an IoT device after a determination that the IoT device is a rogue IoT device or quarantine an IoT device in response to instructions received from a user associated with a private cloud for managing the IoT device. For example, upon determining an IoT device is a rogue IoT device, the intrusion management engine 610 can inform an administrator that the IoT device is a rogue IoT device, and subsequently quarantine or not quarantine the IoT device in response to instructions received from the administrator. Further depending upon implementation-specific or other considerations, the intrusion management engine 610 can automatically block traffic to and from a third party after a determination that the third party is attempting to attack or control IoT devices or block traffic in response to instructions received from a user associated with a private cloud for managing the IoT device. For example, upon determining a third party is attempting to attack IoT device, the intrusion management engine 610 can inform an administrator of the third party attacks, and subsequently block traffic to and from the third party in response to instructions received from the administrator. In various implementations, the intrusion management engine 610 can apply determined remedial actions in the future even if a threat is not detected in the future.

In an example of operation of the example system shown in FIG. 6, the abnormal detection management engine 606 determines if an IoT device is behaving abnormally by monitoring the IoT device and comparing observed behavior to normal device behavior indicated by IoT device data stored in the IoT device datastore 604. In the example of operation of the example system shown in FIG. 6, the abnormal detection management engine 606 performs remedial action based on a determination that the IoT device is behaving abnormally. Further, in the example of operation of the example system shown in FIG. 6, the device vulnerability management engine determines device vulnerability of IoT devices and takes remedial actions based on the determined device vulnerabilities. In the example of operation of the example system shown in FIG. 6, the intrusion management engine 610 detects intrusions of rogue IoT device and/or third parties, and takes remedial actions based on the detected intrusions.

Figure 7:
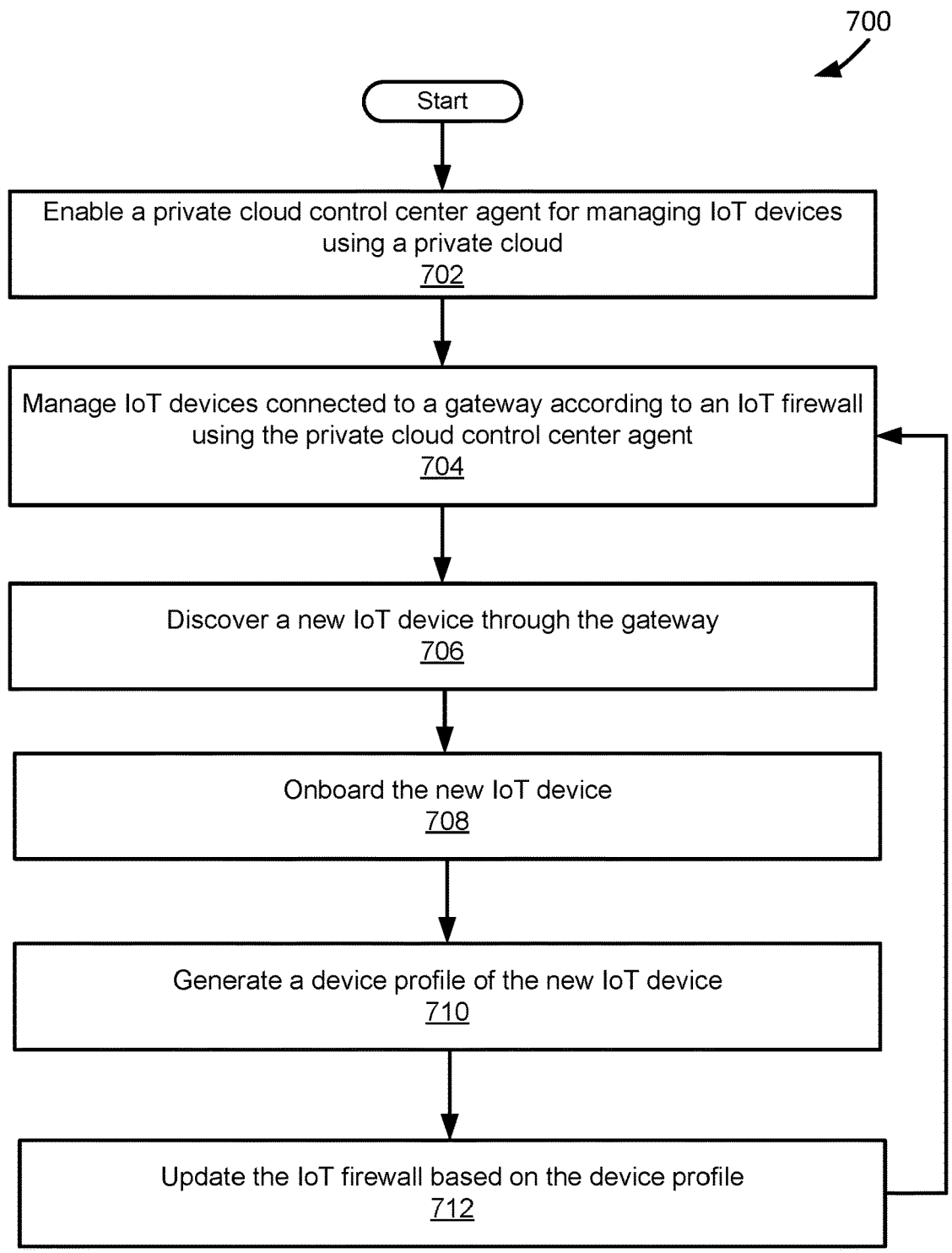
FIG. 7 depicts a flowchart of an example of a method for managing IoT devices using a private cloud.

FIG. 7 depicts a flowchart 700 of an example of a method for managing IoT devices using a private cloud. The flowchart 700 begins at module 702, where a private cloud control center agent is enabled for managing IoT devices using a private cloud. In managing IoT devices using a private cloud, the private cloud control center agent can manage the transmission of data transmitted to and from the IoT devices using the private cloud. The private cloud control center agent can be enabled by an administrator of an entity of which the private cloud is specific. For example, if a private cloud is specific to a family, then a parent in the family can enable the private cloud control center agent.

The flowchart 700 continues to module 704, where IoT devices connected to a gateway are managed according to an IoT firewall by the private cloud control center agent. In managing IoT devices, the private cloud control center agent can control the flow of data to and from the IoT devices according to IoT rules of the IoT firewall. An applicable engine for applying an IoT firewall, such as the data flow management engines described in this paper, can control the flow of data to and from the IoT devices. Depending upon implementation-specific or other considerations, in managing IoT devices, the private cloud control center agent can manage the data flow between the IoT devices and sources on a public network that pass through the private cloud. Further depending upon implementation-specific or other considerations, in managing IoT devices, the private cloud control center agent can manage the flow of data between IoT devices through the private cloud.

The flowchart 700 continues to module 706, where a new IoT device is discovered through the gateway. An applicable engine for discovering a new IoT device, such as the device identification determination engines described in this paper, can discover the new IoT device. A new IoT device can be discovered if it is attempting to connect to the gateway and/or is transmitting a wireless signal. Depending upon implementation-specific or other considerations, as part of discovering the new IoT device, the gateway can send a connection request to the new IoT device and/or receive a connection request from the new IoT device.

The flowchart 700 continues to module 708 where the new IoT device is onboarded. An applicable engine for onboarding an IoT device, such as the onboarding and authentication engines described in this paper, can function to onboard the new IoT device. In onboarding the new IoT device, the private cloud control center agent can determine whether to allow the new IoT device to be managed using the private cloud. The private cloud control center agent can use the IoT firewall to determine whether to onboard the new IoT device. For example, if the new IoT device is of a specific device type and the IoT firewall specifies to not allow devices of the specific device type to be onboarded, then the private cloud control center agent can determine that the new IoT device is not authorized for onboarding. In onboarding the new IoT device the private cloud control center agent can determine an identification/credential of the new IoT device and store the identification/credential as IoT device data.

The flowchart 700 continues to module 710, where a device profile of the new IoT device is generated. An applicable engine for generating and/or updating a device profile of an IoT device, such as the IoT device profiling engines described in this paper, can function to generate a device profile of the new IoT device. A device profile of the new IoT device can be generated by observing traffic flowing into and out of the new IoT device. Depending upon implementation-specific or other considerations, a device profile of the new IoT device can be generated using application profile signatures. For example, it can be determined that a specific application is executed on the IoT device based on the flow of traffic into the IoT device and an application profile signature of the specific application.

The flowchart 700 continues to module 712, where the IoT firewall is updated based on the device profile. An applicable engine for managing an IoT firewall, such as the firewall management engines described in this paper, can function to update the IoT firewall based on the device profile. In updating the IoT firewall, the private cloud control center agent can add new IoT rules and/or change existing IoT rules. For example, if an application is constantly executed on the new IoT device, then the private cloud control center agent can add a new IoT rule specifying to allow all traffic used in the execution of the application on the new IoT device. The flowchart 700 continues back to module 704, where the IoT devices connected to the gateway, including the new IoT device are managed according to the IoT firewall by the private cloud control center agent.

Figure 8:
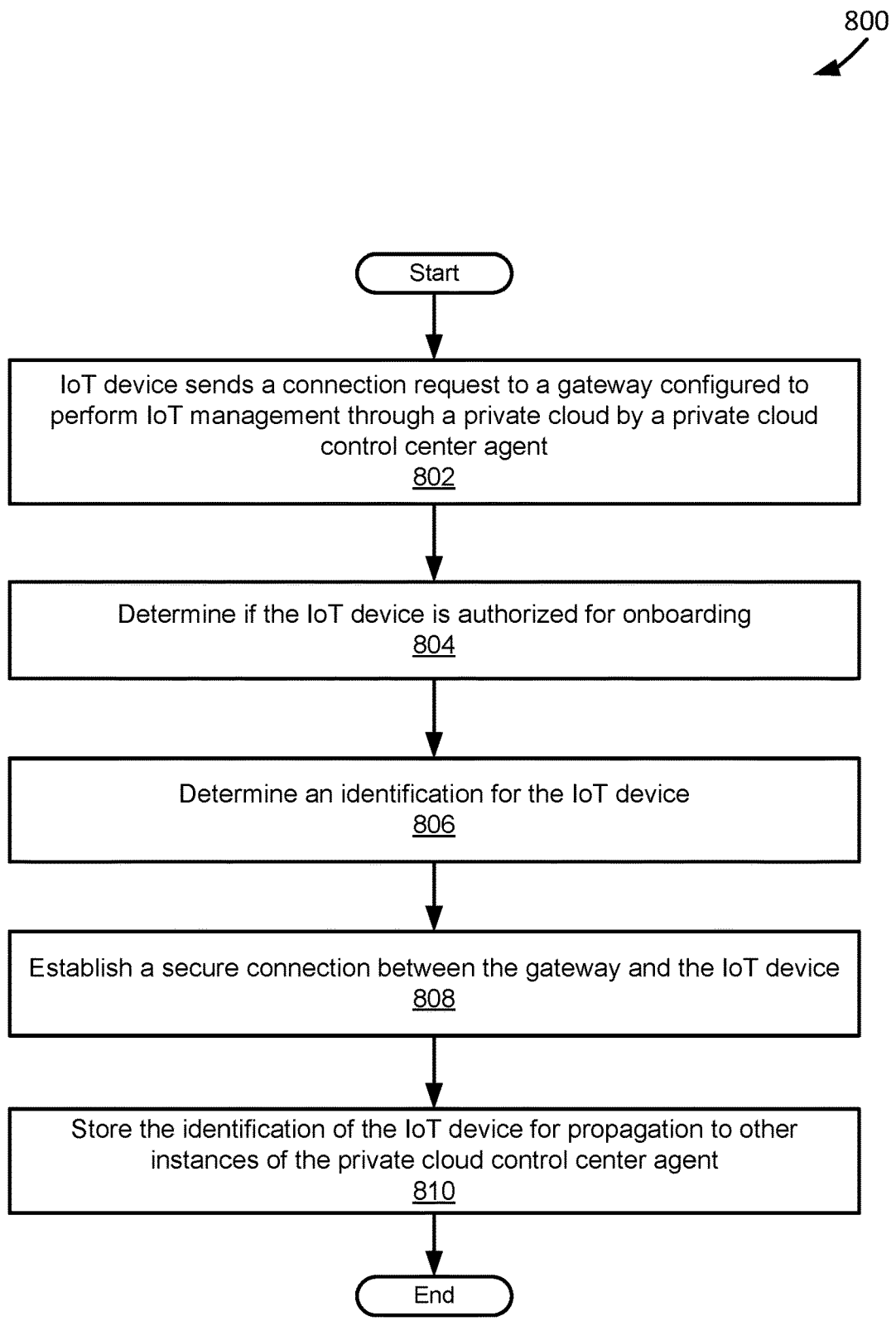
FIG. 8 depicts a flowchart of an example of a method for onboarding an IoT device for management using a private cloud.

FIG. 8 depicts a flowchart 800 of an example of a method for onboarding an IoT device for management using a private cloud. The flowchart 800 begins at module 802, where an IoT device sends a connection request to a gateway configured to perform IoT management through a private cloud by private cloud control center agent. The private cloud control center agent can be implemented in whole or in part on one or an applicable combination of a gateway device, a private cloud, and a public network. The connection request can be received by an applicable engine for receiving a connection request, such as the device identification determination engines described in this paper.

The flowchart 800 continues to module 804, where it is determined if the IoT device is authorized to be onboarded for management. An applicable engine, such as the onboarding and authentication engines described in this paper, can function to determine whether to onboard the IoT device. Depending upon implementation-specific or other considerations, the private cloud control center agent can determine whether the IoT device is authorized to be onboarded for management using either or both an IoT firewall and instructions from an administrator.

The flowchart 800 continues to module 806, where an identification of the IoT device is determined. An applicable engine for determining an identification of an IoT device, such as the device identification determination engines described in this paper, can determine an identification of the IoT device. An identification of the IoT device can be determined by an applicable method of determining an identification of an IoT device by the private cloud control center agent. For example, a MAC address can be included in data received from the IoT device at the gateway which is then used to determine the MAC address is an identification of the IoT device. Depending upon implementation-specific or other considerations, an identification of the IoT device can be determined as part of an authentication process for the IoT device, e.g. pre-shared key exchange or private pre-shared key exchange.

The flowchart 800 continues to module 808, where a secure connection is established between the gateway and the IoT device. An applicable engine for establishing a secure connection, such as the device identification determination engines described in this paper, can establish a secure connection between the gateway and the IoT device. A secure connection can be established in accordance with an applicable wireless connection. For example, a secure connection can be established through a Wi-Fi connection. A secure connection can be established as part of an authentication process of the IoT device. Examples of authentication processes include pre-shared key exchange and private pre-shared key exchange.

The flowchart 800 continues to module 810, where the identification of the IoT device is stored for propagation to other instances of the private cloud control center agent. In propagating the identification of the IoT device to other instances of the private cloud control center agent, the identification can be used to authenticate the IoT device upon reconnection to the gateway in future sessions.

Figure 9:
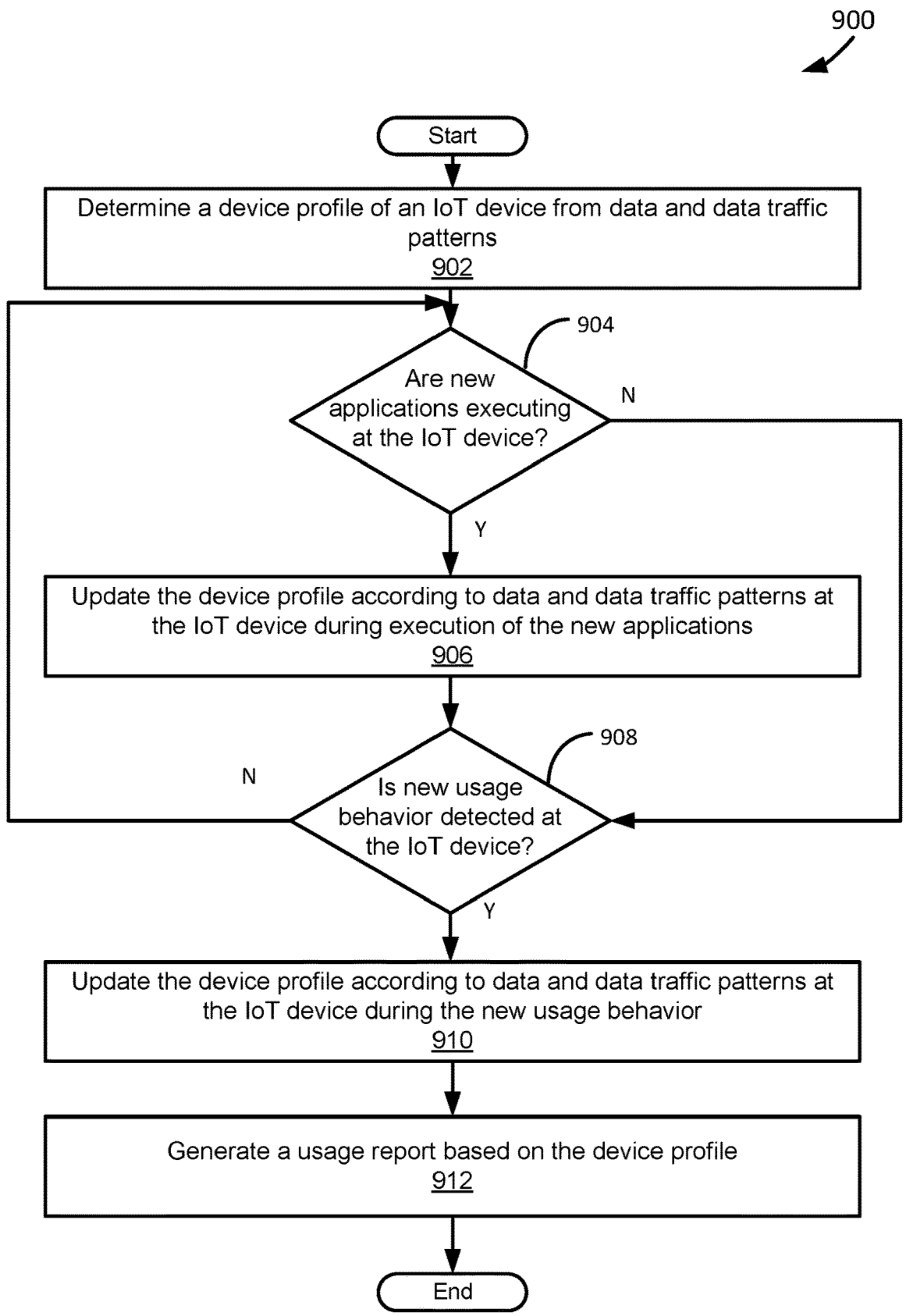
FIG. 9 depicts a flowchart of an example of profiling an IoT device for use in managing the IoT device through a private cloud.

FIG. 9 depicts a flowchart 900 of an example of profiling an IoT device for use in managing the IoT device through a private cloud. The flowchart 900 begins at module 902, where a device profile of an IoT device connected to a gateway is determined. An applicable engine for profiling an IoT device, such as the IoT device profiling engines described in this paper, can profile an IoT device. A device profile of an IoT device can be determined from data flowing to and from the IoT device and/or traffic patterns of the data flowing to and from the IoT device.

The flowchart 900 continues to decision point 904, where it is determined if new applications are executing at the IoT device. An applicable engine for profiling an IoT device, can determine if new applications are executing at the IoT device. Whether new applications are executing at the IoT device can be determined based on data flow and traffic patterns of data flow for the IoT device. For example, if a flow of data to and from the IoT device suddenly changes, then it can be determined that new applications are executing at the IoT device. In another example if data packets of a different type are flowing to and from the IoT device, then it can be determined that new applications are executing at the IoT device.

If it is determined that new applications are executing at the IoT device, then the flowchart 900 continues to module 906, where the device profile of the IoT device is updated according to the data and data traffic patterns of the IoT device as the new applications execute at the IoT device. For example, a device profile can be updated to reflect that the new applications are executing at the IoT device based on data sent to and from the IoT device in executing the new applications. An applicable engine for profiling an IoT device, can update a device profile of the IoT device.

If it is determined that new applications are not executed at the IoT device, then the flowchart 900 continues to decision point 908. At decision point 908, it is determined if new usage behavior is detected at the IoT device. An applicable engine for profiling an IoT device, such as the IoT device profiling engines described in this paper, can determine new usage behavior of an IoT device. New usage behavior can be detected at the IoT device based on data sent to and from the IoT device and/or data traffic patterns of data sent to and from the IoT device. For example, new usage behavior can be detected if a sudden increase in the amount of data sent to the IoT device occurs.

If it is determined that new usage behavior is detected at the IoT device, then the flowchart 900 continues to module 910, where the device profile of the IoT device is updated according to the data and data traffic patterns of the IoT device during the new usage behavior at the IoT device. For example, a device profile can be updated to reflect that a specific user is operating the IoT device based on data sent to and from the IoT device during the time in which the new usage behavior occurs at the IoT device. An applicable engine for profiling an IoT device, can update a device profile of the IoT device.

The flowchart 900 continues to module 912, where a usage report is generated based on the device profile. A usage report can be generated by a private cloud control center agent. A usage report can include information describing the operation of the IoT device, such as what applications are executed at the IoT device, an amount of time applications are executing at the IoT device, an amount and identification of data sent to and from the IoT device, and a specific user of the IoT device. For example, a usage report can specify what websites a child is viewing on their mobile device. The IoT device profiling engine can function to generate a usage report based on the device profile.

Figure 10:
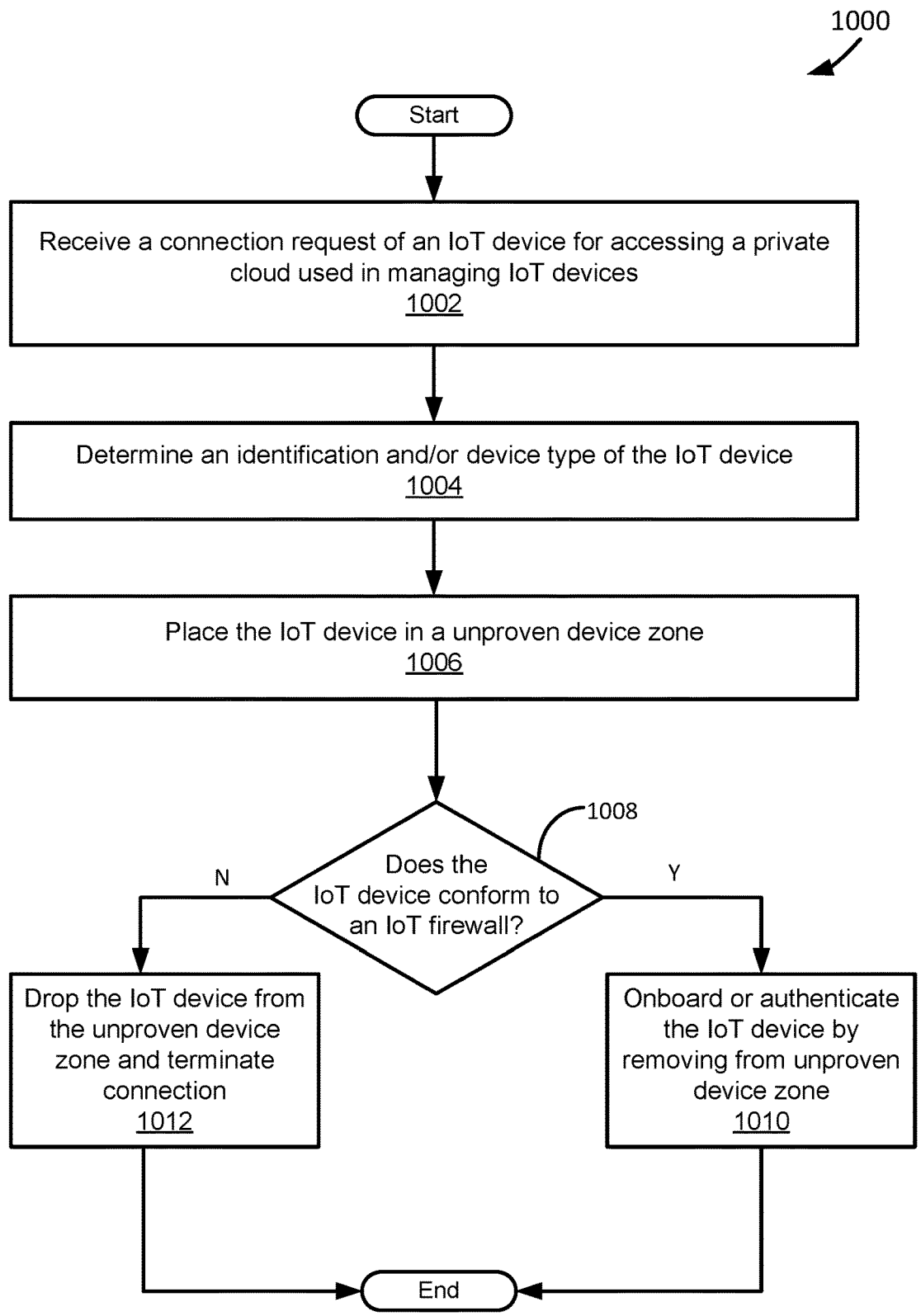
FIG. 10 depicts a flowchart of an example of a method for onboarding or authenticating an IoT device for management through a private cloud.

FIG. 10 depicts a flowchart 1000 of an example of a method for onboarding or authenticating an IoT device for management through a private cloud. The flowchart 1000 begins at module 1002, where a connection request is received from an IoT device for accessing a private cloud used to manage IoT devices. A connection request can be received by an applicable engine for receiving connection requests, such as the device identification determination engines described in this paper. A connection request can be received the first time an IoT device attempts to connect to a private cloud or during a session after an initial session in which the IoT device was connected to the private cloud.

The flowchart 1000 continues to module 1004, where an identification of the IoT device is determined. An applicable engine for determining IoT device identification, such as the device identification determination engines described in this paper, can determine an identification of the IoT device. Depending upon implementation-specific or other considerations, an identification of the IoT device can be determined from data received from the IoT device.

The flowchart 1000 continues to module 1006, where the IoT device is placed in an unproven device zone. An applicable engine for onboarding and/or authenticating an IoT device, such as the onboarding and authentication engines described in this paper, can place the IoT device in an unproven device zone. A scope of an unproven device zone in which the IoT device is placed can be based on the identification of the IoT device and/or a user of the IoT device. An unproven device zone can include limited access to resources provided through the private cloud.

The flowchart 1000 continues to decision point 1008 where it is determined if the IoT device conforms to an IoT firewall is determined. An applicable engine for onboarding and/or authenticating an IoT device, such as the onboarding and authentication engines described in this paper, can determine if the IoT device conforms to an IoT firewall. In seeing whether an IoT test conforms to an IoT firewall, it is determined if the IoT device is in conformity with IoT rules specific to the identification of the IoT device.

If it is determined at decision point 1008, that the IoT device does conform to the IoT firewall, then the flowchart 1000 continues to module 1010. At module 1010, the flowchart 1000 includes onboarding or authenticating the IoT device for management through the private cloud by removing the IoT device from the unproven device zone and coupling it to the private cloud. An applicable engine for onboarding and/or authenticating an IoT device, such as the onboarding and authentication engines described in this paper, can onboard or authenticate the IoT device for management through the private cloud by removing the IoT device from the unproven device zone and coupling it to the private cloud.

If it is determined at decision point 1008, that the IoT device does not conform to the IoT firewall, then the flowchart 1000 continues to module 1012. At module 1012, the flowchart 1000 includes dropping the IoT device from the unproven device zone and failing to authenticate or onboard the IoT device and subsequently couple it to the private cloud. An applicable engine for onboarding and/or authenticating an IoT device, such as the onboarding and authentication engines described in this paper, can drop the IoT device from the unproven device zone and fail to authenticate or onboard the IoT device.

Figure 11:
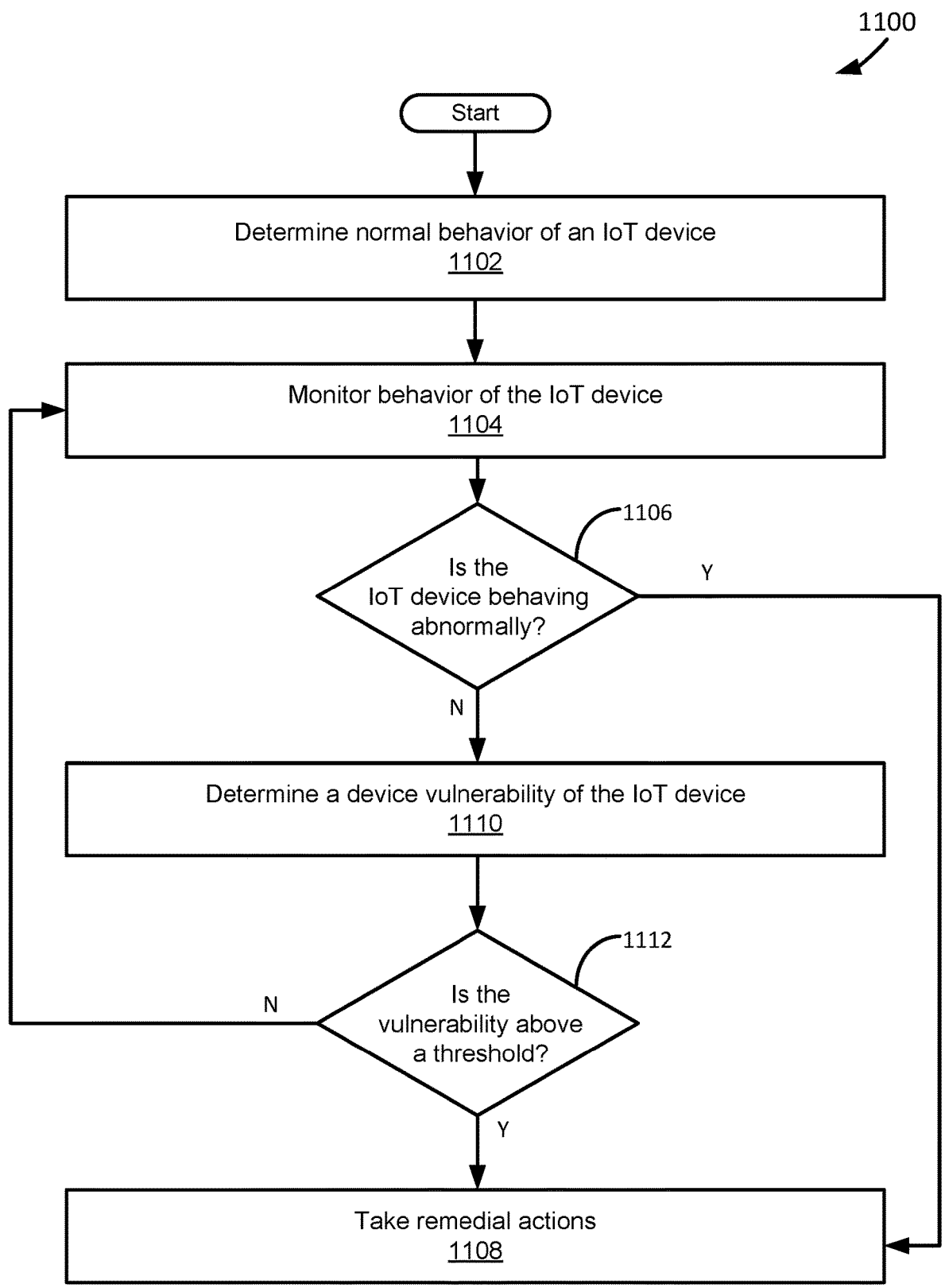
FIG. 11 depicts a flowchart of an example of providing security to IoT devices manages through a private cloud.

FIG. 11 depicts a flowchart 1100 of an example of providing security to IoT devices manages through a private cloud. The flowchart 1100 begins at module 1102, where normal behavior of a managed IoT device is determined. An applicable engine for determining a device profile of an IoT device, such as the IoT device profiling engines described in this paper, can determine normal behavior of a managed IoT device. IoT device data for an IoT device data can be generated and/or updated to reflect normal behavior of an IoT device.

The flowchart 1100 continues to module 1104, where behavior of the IoT device is monitored. An applicable engine for determining whether an IoT device's behavior is abnormal, such as the abnormal detection management engines described in this paper, can function to monitor behavior of the IoT device. Behavior of the IoT device can be monitored constantly in real time or logged for later use.

The flowchart 1100 continues to decision point 1106, where it is determined if the IoT device is behaving abnormally. Whether the IoT device is behaving abnormally can be determined by an applicable engine for determining whether an IoT device's behavior is abnormal, such as the abnormal detection management engines described in this paper. Monitored behavior of the IoT device can be compared to normal behavior of the IoT device to determine if the IoT device is behaving abnormally.

If it is determined at decision point 1106, that the IoT device is behaving abnormally, then the flowchart 1100 continues to module 1108, where remedial actions are taken. An applicable engine for taking remedial action in response to detection of abnormal behavior, such as the abnormal detection management engines described in this paper, can take remedial actions. Remedial actions can include either or both quarantining the IoT device or informing a user associated with the private cloud that the IoT device is exhibiting abnormal behavior.

If it is determined at decision point 1106, that the IoT device is behaving normally, then the flowchart 1100 continues to module 1110, where a device vulnerability of the IoT device is determined. An applicable system for managing device vulnerability of IoT devices, such as the device vulnerability management engines described in this paper, can determine a device vulnerability of the IoT device. Device vulnerability of an IoT device can be determined by either or both simulating an attack on the IoT device or analyzing current device characteristics of the IoT device, as included as part of IoT device data.

The flowchart 100 continues to decision point 1112, where it is determined if a vulnerability of the IoT device is above a threshold vulnerability level. An applicable system for managing device vulnerability of IoT devices, such as the device vulnerability management engines described in this paper, can determine if a device vulnerability of the IoT device is above a threshold vulnerability. If it is determined at decision point 1112 that the device vulnerability of the IoT device is not above a threshold, then the flowchart 1100 continues back to module 1104, where the behavior of the IoT device is monitored.

If it is determined at decision point 1112, that the vulnerability of the IoT device is above a threshold vulnerability level, then the flowchart 1100 continues to module 1108, where remedial actions are taken. An applicable engine for taking remedial action in response to device vulnerability, such as the device vulnerability management engines described in this paper, can take remedial actions. Remedial actions can include either or both quarantining the IoT device or informing a user associated with the private cloud that the IoT device is vulnerable to attack.

Figure 12:
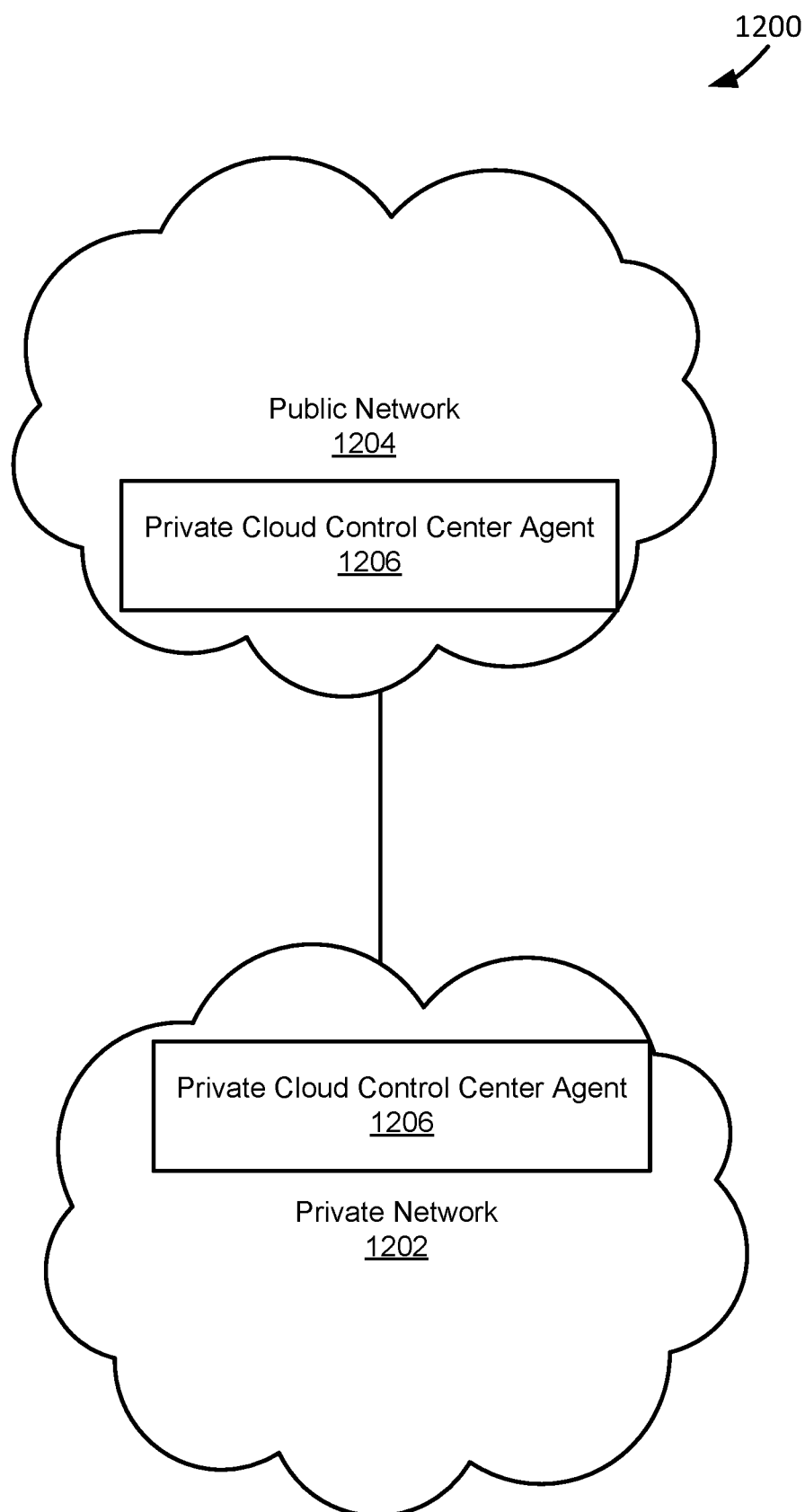
FIG. 12 depicts a diagram of an example of a network topology for managing IoT devices.

FIG. 12 depicts a diagram 1200 of an example of a network topology for managing IoT devices. The example network topology includes a private network 1202 and a public network 1204. The private network 1202 can be implemented through, at least in part, an IoT device firewall.

The example network topology shown in FIG. 12 includes a private cloud control center agent 1206 implemented as part of both the private network 1202 and the public network 1204. In managing IoT devices the private cloud control center agent 1206 can apply an IoT firewall to control the flow of data through the private network 1202 or through the public network 1204. For example, the private cloud control center agent 1206 can control the flow of data between IoT devices through the private network 1202. In another example the private cloud control center agent 1206 can control the flow of data between an IoT device through a private network 1202 to a party coupled through the public network 1204.

Figure 13:
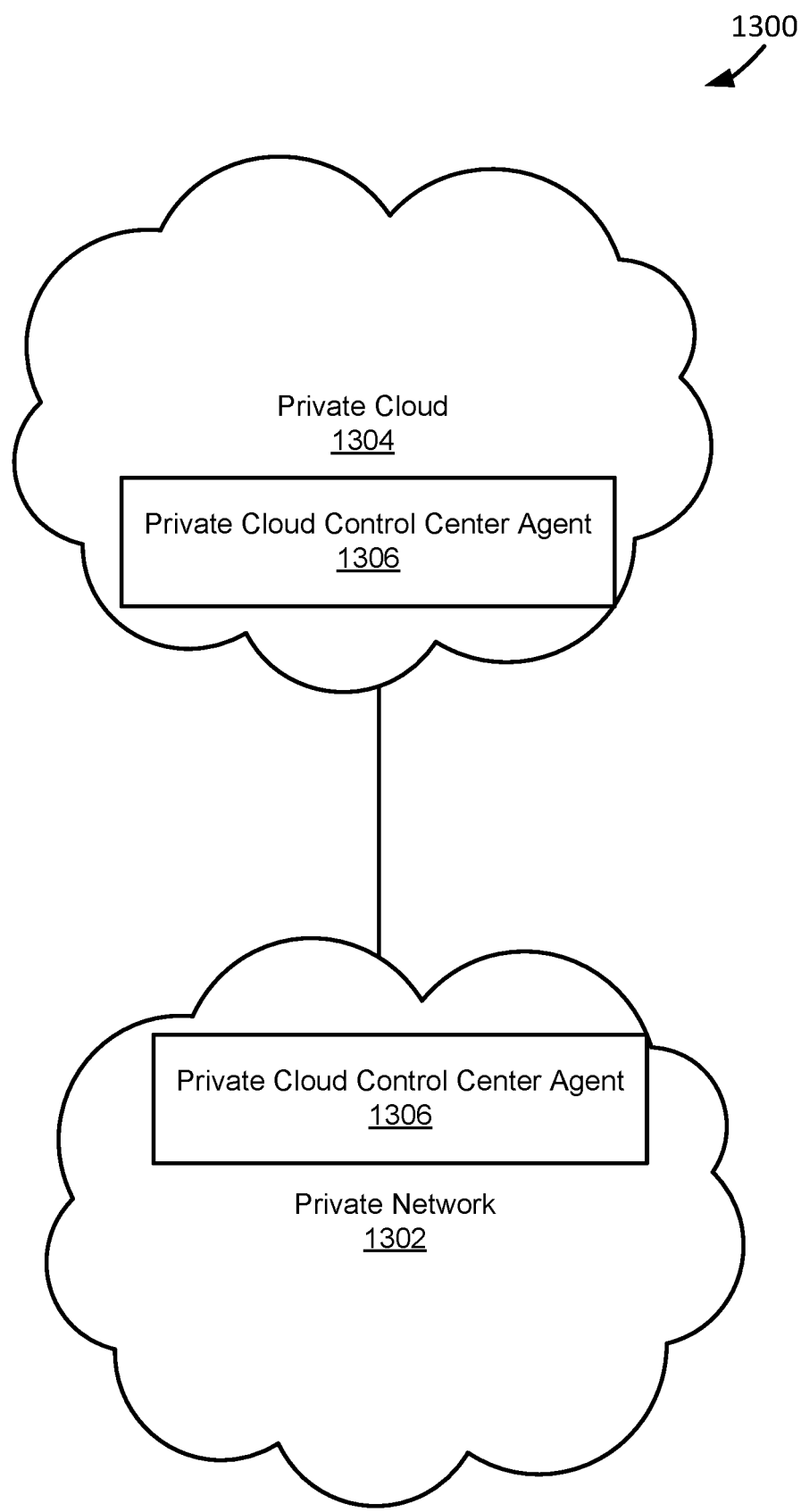
FIG. 13 depicts a diagram of an example of another network topology for managing IoT devices.

FIG. 13 depicts a diagram 1300 of an example of another network topology for managing IoT devices. The example network topology includes a private network 1302 and a private cloud 1304. The private network 1302 and the private cloud 1304 can be implemented through, at least in part, an IoT device firewall.

The example network topology shown in FIG. 13 includes a private cloud control center agent 1306 implemented as part of both the private network 1302 and the private cloud 1304. In managing IoT devices the private cloud control center agent 1306 can apply an IoT firewall to control the flow of data in the private network 1302 or through the private cloud 1304. For example, the private cloud control center agent 1306 can control the flow of data between IoT devices through the private network 1302.

Figure 14:
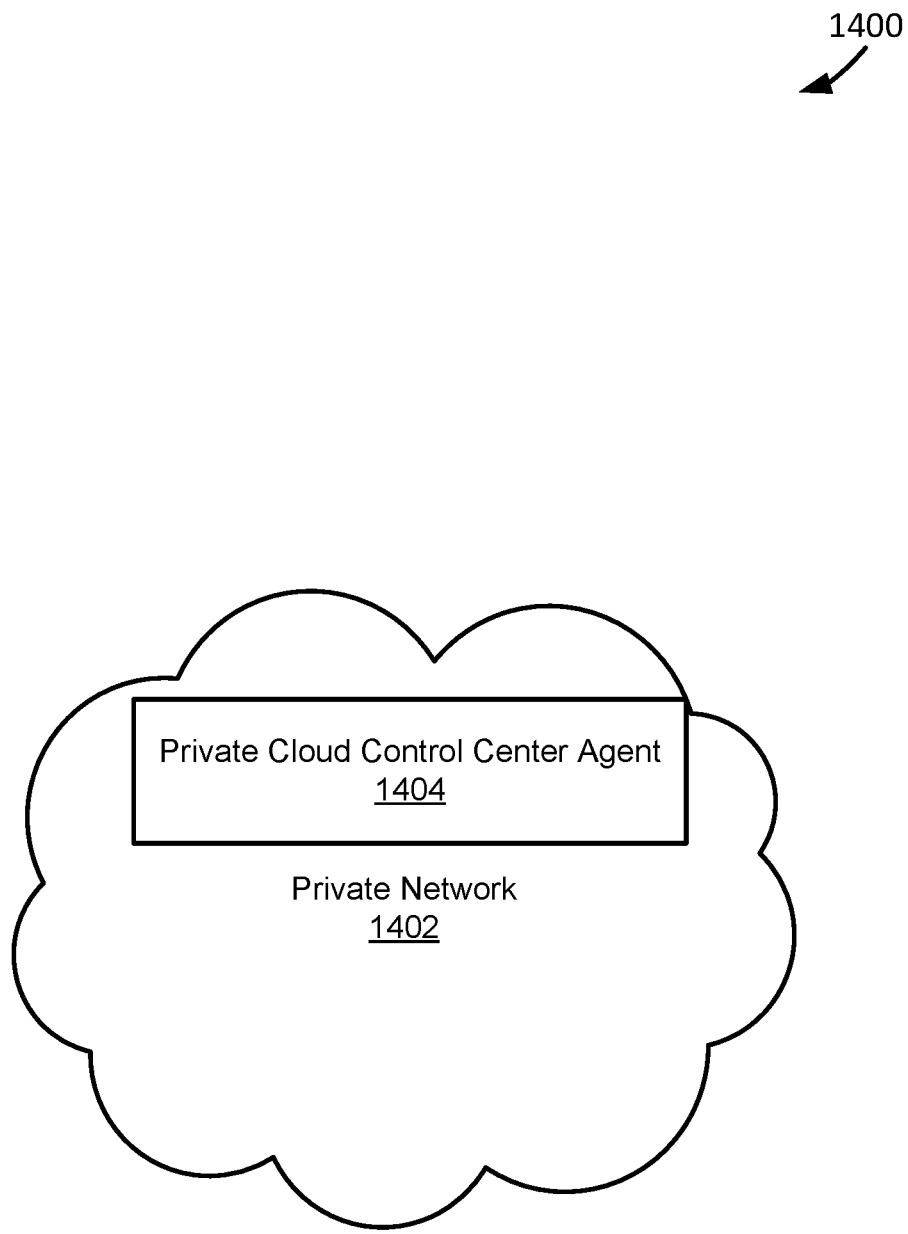
FIG. 14 depicts a diagram of an example of another network topology for managing IoT devices.

FIG. 14 depicts a diagram 1400 of an example of another network topology for managing IoT devices. The example network topology includes a private network 1402 and a private cloud control center agent 1404.

The private cloud control center agent 1404 can be used in managing IoT devices coupled to the private network 1402. In managing IoT devices, the private cloud control center agent 1404 can apply an IoT firewall to control the flow of data through the private network 1402. For example, the private cloud control center agent 1404 can control the flow of data between IoT devices through the private network 1402.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

We claim:

1. A method comprising:
monitoring, by a private cloud control center agent that is provided between a public network and a private cloud, a data transmission of an Internet of Things (IoT) device to an intended destination resource on the public network, wherein the monitoring is carried out through the private cloud in accordance with an IoT rule that is applied in the data transmission of the IoT device, the IoT device being connected for management thereof by the private cloud control center agent through the private cloud, wherein the private cloud control center agent is configured to modify at least a portion of the monitored data transmission before it is sent to the intended destination resource on the public network, wherein modifying the at least the portion of the monitored data transmission includes performing at least one action including removing or rewriting at least a portion of the monitored data transmission to remove at least one of: (1) a device type, (2) an operating system, or (3) a firmware version of the IoT device;

detecting, by the private cloud control center agent, security-risking behavior of the IoT device at least based on the monitored data transmission of the IoT device, wherein detecting the security-risking behavior of the IoT device includes comparing a previously determined device profile for the IoT device with the monitored data transmission, wherein the previously determined device profile describes previously determined normal behavior of the IoT device, and wherein the previously determined device profile was determined at least in part by a device profiling engine configured to:
monitor data collected by a device interposed between the IoT device and a remote resource, wherein the collected data comprises data transmitted from the IoT device to the remote resource;
generate an initial device profile for the IoT device; and
update the initial device profile based at least in part on observed data; and
upon detecting the security-risking behavior of the IoT device, performing, by the private cloud control center agent, a remedial action for the data transmission of the IoT device.

2. The method of claim 1, wherein:
the security-risking behavior of the IoT device is detected based at least in part on comparison of a reference behavior with the monitored data transmission of the IoT device; and
the reference behavior is one or an applicable combination of: past behavior of the IoT device, behavior of other IoT devices managed by the private cloud control center agent, behavior of other IoT devices of a same type, or IoT devices used by users other than a user of the IoT device.

3. The method of claim 1, wherein:
the security-risking behavior of the IoT device is detected based at least in part on comparison of a reference behavior with the monitored data transmission of the IoT device; and
the comparison includes comparison of at least one of: a destination of data transmitted through the data transmission, timing of the data transmission, an amount of data transmitted through the data transmission, or a bytes histogram of data transmitted through the data transmission.

4. The method of claim 1, further comprising:
simulating an attack of a third party device attempting to gain control of the IoT device by sending data to the IoT device; and
determining a security-risking state of the IoT device based on a response, by the IoT device, to the data.

5. The method of claim 1, wherein the remedial action includes quarantining the IoT device.

6. The method of claim 1, wherein the remedial action includes alerting a user associated with the private cloud that the IoT device is behaving abnormally.

7. The method of claim 1, wherein the data transmission of the IoT device includes data transmission between the IoT device and other IoT devices managed through the private cloud.

8. The method of claim 1, wherein the data transmission of the IoT device includes data transmission between the IoT device and a source accessed through, at least in part, a public network.

9. The method of claim 1, wherein the device interposed between the IoT device and the remote resource comprises a firewall.

10. The method of claim 1, wherein the device interposed between the IoT device and the remote resource is configured to intercept the data transmitted from the IoT device to the remote resource.

11. A system comprising:
a private cloud control center agent, comprising a processor, provided between a public network and a private cloud and configured to:
monitor a data transmission of an Internet of Things (IoT) device to an intended destination resource on the public network, wherein the monitoring is carried out through the private cloud in accordance with an IoT rule that is applied in the data transmission of the IoT device, when the IoT device is connected for management thereof by the private cloud control center agent through the private cloud, wherein the private cloud control center agent is configured to modify at least a portion of the monitored data transmission before it is sent to the intended destination resource on the public network, wherein modifying the at least the portion of the monitored data transmission includes performing at least one action including removing or rewriting at least a portion of the monitored data transmission to remove at least one of: (1) a device type, (2) an operating system, or (3) a firmware version of the IoT device;
detect security-risking behavior or state of the IoT device at least based on the monitored data transmission of the IoT device, wherein detecting the security-risking behavior of the IoT device includes comparing a previously determined device profile for the IoT device with the monitored data transmission, wherein the previously determined device profile describes previously determined normal behavior of the IoT device, and wherein the previously determined device profile was determined at least in part by a device profiling engine configured to:
monitor data collected by a device interposed between the IoT device and a remote resource, wherein the collected data comprises data transmitted from the IoT device to the remote resource;
generate an initial device profile for the IoT device; and
update the initial device profile based at least in part on observed data; and
upon detecting the security-risking behavior or state of the IoT device, perform a remedial action for the data transmission of the IoT device.

12. The system of claim 11, wherein
the security-risking behavior of the IoT device is detected based at least in part on comparison of a reference behavior with the monitored data transmission of the IoT device; and
the reference behavior is one or an applicable combination of: past behavior of the IoT device, behavior of other IoT devices managed by the private cloud control center agent, behavior of other IoT devices of a same type, or IoT devices used by users other than a user of the IoT device.

13. The system of claim 11, wherein
the security-risking behavior of the IoT device is detected based at least in part on comparison of a reference behavior with the monitored data transmission of the IoT device; and
the comparison includes comparison of at least one of: a destination of data transmitted through the data transmission, timing of the data transmission, an amount of data transmitted through the data transmission, or a bytes histogram of data transmitted through the data transmission.

14. The system of claim 11, wherein the private cloud control center agent is further configured to simulate an attack of a third party device attempting to gain control of the IoT device by sending data to the IoT device, and determine a security-risking state of the IoT device based on a response, by the IoT device, to the data.

15. The system of claim 11, wherein the remedial action includes quarantining the IoT device.

16. The system of claim 11, wherein the remedial action includes alerting a user associated with the private cloud that the IoT device is behaving abnormally.

17. The system of claim 11, wherein the data transmission of the IoT device includes data transmission between the IoT device and other IoT devices managed through the private cloud.

18. The system of claim 11, wherein the data transmission of the IoT device includes data transmission between the IoT device and a source accessed through, at least in part, a public network.

19. The system of claim 11, wherein the device interposed between the IoT device and the remote resource comprises a firewall.

20. The system of claim 11, wherein the device interposed between the IoT device and the remote resource is configured to intercept the data transmitted from the IoT device to the remote resource.

* * * * *